(12) United States Patent
Kettler et al.

(10) Patent No.: US 11,719,578 B2
(45) Date of Patent: Aug. 8, 2023

(54) APPARATUS AND METHOD FOR EFFECT PIGMENT IDENTIFICATION

(71) Applicant: X-Rite Europe GmbH, Regensdorf (CH)

(72) Inventors: Wilhelm H. Kettler, Regensdorf (CH); Milos Sormaz, Regensdorf (CH); Peter Ehbets, Regensdorf (CH)

(73) Assignee: X-RITE EUROPE GMBH, Regensdorf (CH)

( * ) Notice: Subject to any disclaimer, the term of this patent is extended or adjusted under 35 U.S.C. 154(b) by 739 days.

(21) Appl. No.: 16/329,835

(22) PCT Filed: Aug. 25, 2017

(86) PCT No.: PCT/EP2017/071395
§ 371 (c)(1),
(2) Date: Apr. 16, 2019

(87) PCT Pub. No.: WO2018/041727
PCT Pub. Date: Mar. 8, 2018

(65) Prior Publication Data
US 2021/0310870 A1    Oct. 7, 2021

Related U.S. Application Data

(60) Provisional application No. 62/382,813, filed on Sep. 2, 2016.

(51) Int. Cl.
*G01J 3/46* (2006.01)
*G01J 3/50* (2006.01)
(Continued)

(52) U.S. Cl.
CPC ............... *G01J 3/504* (2013.01); *G01J 3/463* (2013.01); *G06T 7/41* (2017.01); *G06T 7/60* (2013.01); *G06T 7/90* (2017.01)

(58) Field of Classification Search
CPC .... G01J 3/463; G01J 3/504; G01N 2021/575; G06T 7/41; G06T 7/60; G06T 7/90
See application file for complete search history.

(56) References Cited

U.S. PATENT DOCUMENTS 7,542,624 B1 *  6/2009  Koch ................... G06V 10/757
                                                 382/209
2004/0218182 A1 * 11/2004  Alman ...................... G01J 3/46
                                                 356/402
(Continued)

FOREIGN PATENT DOCUMENTS

DE   10 2015 003947   11/2015
EP           695096 A1 *  1/1996 ............. H04N 19/51

OTHER PUBLICATIONS

Toque et al. ("Pigment identification by analytical imaging using multispectral images," 16th IEEE International Conference on Image Processing; Date of Conference: Nov. 7-10, 2009) (Year: 2009).*

(Continued)

*Primary Examiner* — Yubin Hung
(74) *Attorney, Agent, or Firm* — Hahn Loeser & Parks LLP

(57) ABSTRACT

A computer-implemented method for identifying an effect pigment, the method comprising executing, on at least one processor of at least one computer, steps of: a) acquiring sample image data describing a digital image of a layer comprising a sample effect pigment b) determining, based on the sample image data, sparkle point data describing a sample distribution of sparkle points defined by the digital image, wherein the sample distribution is defined in an N-dimensional color space, wherein N is an integer value equal to or larger than 3; c) determining, based on the sparkle point data, sparkle point transformation data describing a transformation of the sample distribution into an (Continued)

(N–1)-dimensional color space; d) determining, based on the sparkle point transformation data, sparkle point distribution geometry data describing a geometry of the sample distribution; e) acquiring reference distribution geometry data describing a geometry of a reference distribution of sparkle points in the (N–1)-dimensional color space; f) acquiring reference distribution association data describing an association between the reference distribution and an identifier of the reference distribution; g) determining, based on the sparkle point distribution geometry data and the reference distribution geometry data and the reference distribution association data, sample pigment identity data describing an identity of the sample effect pigment.

13 Claims, 14 Drawing Sheets

(51) Int. Cl.
　　*G06T 7/41*　　　(2017.01)
　　*G06T 7/60*　　　(2017.01)
　　*G06T 7/90*　　　(2017.01)

(56) References Cited

U.S. PATENT DOCUMENTS

| | | | |
|---|---|---|---|
| 2005/0225357 A1* | 10/2005 | Sommer | G11C 7/1087 326/93 |
| 2007/0003691 A1 | 4/2007 | Rodrigues et al. | |
| 2009/0019086 A1 | 1/2009 | Prakash et al. | |
| 2009/0063105 A1 | 5/2009 | Chang et al. | |
| 2010/0205142 A1* | 8/2010 | Feulner | G16H 30/20 707/E17.014 |
| 2011/0103691 A1* | 5/2011 | Yun | G06F 16/583 382/218 |
| 2011/0234842 A1* | 9/2011 | Ishiga | H04N 9/04557 348/E9.037 |
| 2013/0279794 A1* | 10/2013 | Greenberg | G06K 9/6284 382/149 |
| 2016/0117844 A1 | 4/2016 | Beymore | |

OTHER PUBLICATIONS

International Search Report and Written Opinion of the International Searching Authority for PCT/EP2017/071395 dated Feb. 2, 2018.

Extended European Search Report regarding EP20217939.6,dated Apr. 19, 2021 (9 pgs.).

* cited by examiner

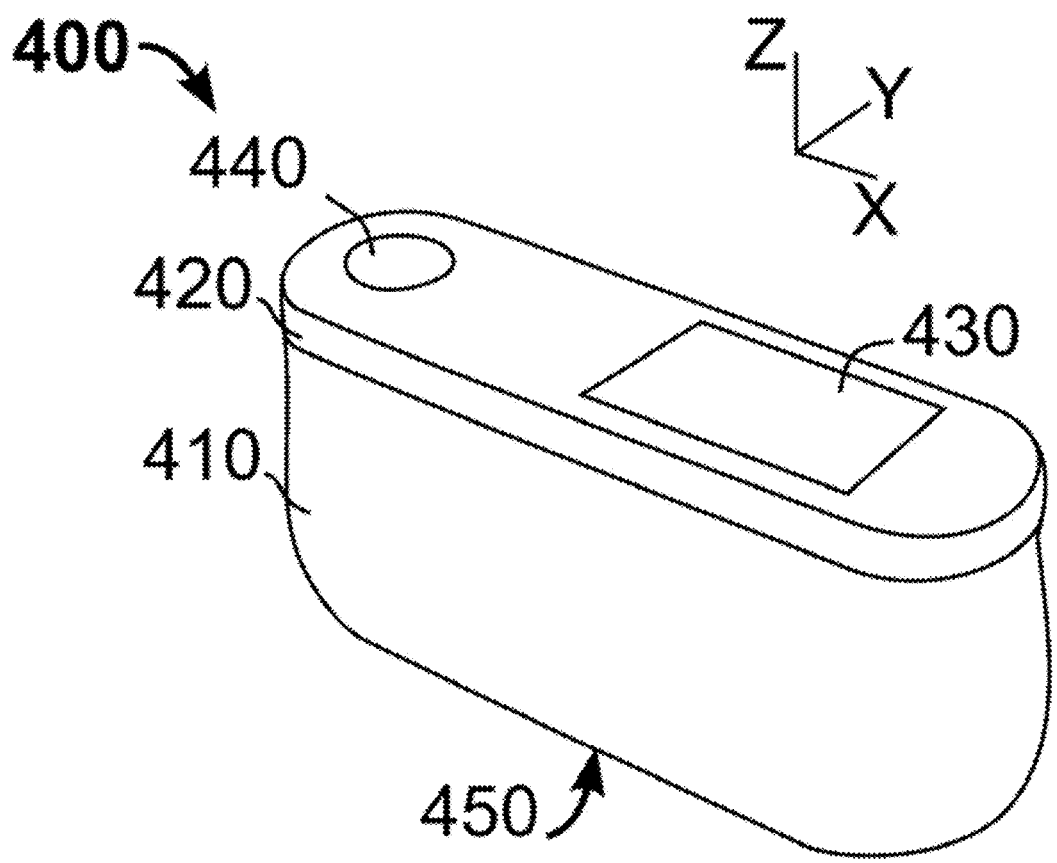

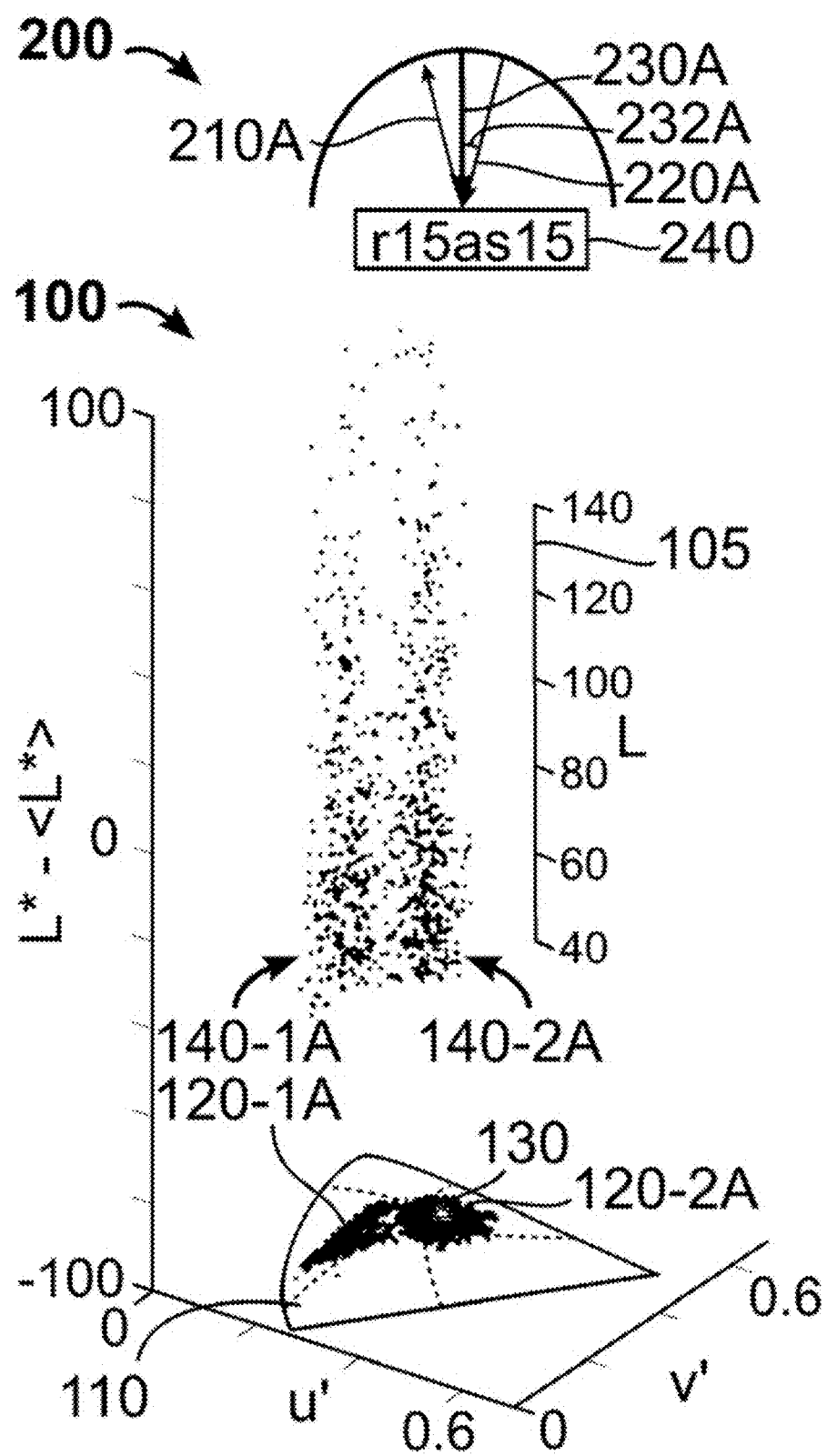

FIG. 9A1
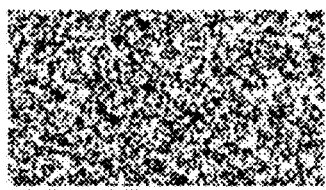
r15as15
FIG. 9A2
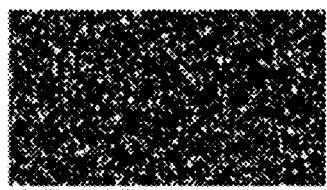
r15as45
FIG. 9A3
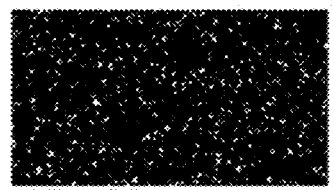
r15as80
FIG. 9B1
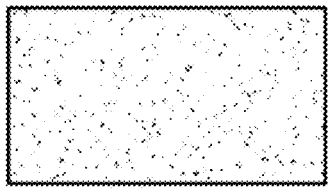
r15as15
FIG. 9B2
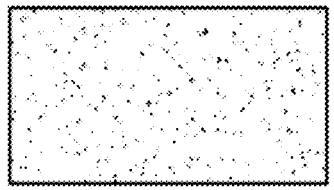
r15as45
FIG. 9B3
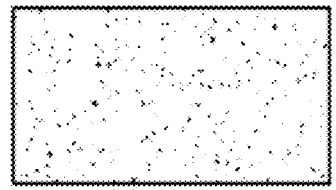
r15as80
FIG. 9C1
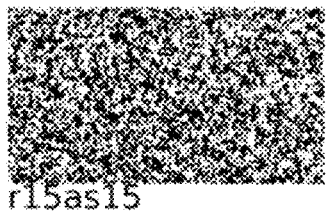
r15as15
FIG. 9C2
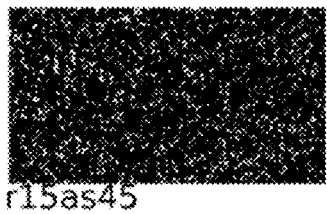
r15as45
FIG. 9C3
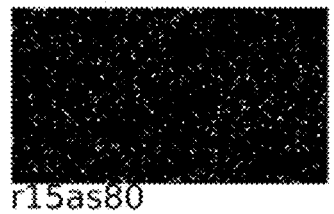
r15as80
FIG. 9D1
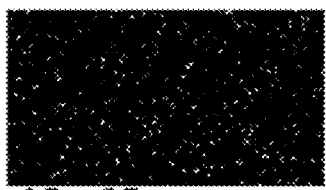
r15as15
FIG. 9D2
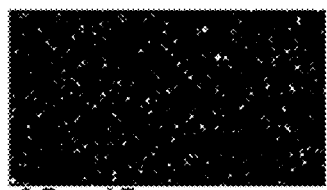
r15as45
FIG. 9D3
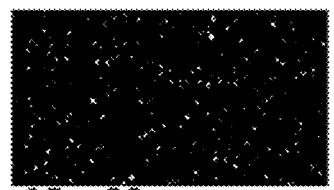
r15as80

APPARATUS AND METHOD FOR EFFECT PIGMENT IDENTIFICATION

CROSS-REFERENCE TO RELATED APPLICATIONS

The present application is a National Stage Entry of International Patent Application serial number PCT/EP17/71395, filed Aug. 25, 2017, entitled "APPARATUS AND METHOD FOR EFFECT PIGMENT IDENTIFICATION," currently expired; which claims priority from Provisional Application Ser. No. 62/382,813, filed Sep. 2, 2016, entitled "APPARATUS AND METHOD FOR EFFECT PIGMENT IDENTIFICATION".

FIELD OF THE INVENTION

The present disclosure relates to the identification of effect pigments in layers.

BACKGROUND

Comparing or matching colors of surfaces coated with paints containing effect pigments is challenging both visually or using color measurement devices. Such paints are for example often seen on cars. A core problem derives from the fact that effect pigments form very bright spots with changing colors depending on viewing and illumination angle. Automatic or human-assisted identification of a coating containing effect pigments may therefore require a large number of measurements, data processing that is adapted to coatings containing effect pigments, and effect pigment classification and identification methods. Although some devices may provide information based on broad imaging of coatings containing effect pigments, they may fail to provide the effect pigment-level identification that may be needed for the precise analysis required to formulate the ingredients needed to produce a corresponding coating.

Efficient matching of gonioapparent color shades of undisclosed pigmentation is a major and time-consuming task in various areas of application of coatings industry. This task is particularly challenging in those cases, where color standards contain effect pigments such as platelet-like pearlescent (interference) or metallic particle types.

In order to keep the number of combinations in a combinatorial search for a matching formulation tractable it is necessary to identify as many pigments as possible in advance so that they are an integral part of all formulations tested in the computational process. If, e. g., all effect pigments used in a color target can be identified in advance, only the solid pigments of the formulation need to be determined in the combinatorial search for the best matching formula, which will result in a dramatic saving in compute time.

Identification of effect pigments in surface coatings by traditional visual assessment under a spot light source is a challenging task requiring well-controlled viewing conditions and many years of experience in color development. The appearance of gonioapparent surface coatings is determined by complex interaction of color and visual texture. The latter is an appearance feature of effect pigments and describes the observed non-homogeneity of color and/or intensity distribution at the surface of a gonioapparent material. Characteristic sparkle of effect pigments depends on viewing with directional illumination. When viewed in diffuse illumination the sparkle of a coating virtually disappears and gives way to an irregular lightness pattern, characteristic for the grade of an effect pigment, its morphological properties or/and the particle topology within a coating. The latter can be influenced by adding a flop control agent to a paint formulation or by application conditions.

Flake appearance of effect pigments depends on just a few visual features so there is relatively little information for classifying them. The sample appearance also depends on lightness, color and other pigments in an effect color coating so that it is difficult to compare. A typical recipe for an effect color shade is a blend of two or more effect pigments and three or more transparent or semi-transparent solid pigments. Determining the composite visual appearance created by two or more effect pigments from reference samples of single flakes is not effective, in particular if the color of sample coating and reference differ (for example, comparison of a flake reference in a silver color to a blue metallic/pearlescent test color). An inherent limitation of visual assessment of gonioapparent surface coatings with the goal of identification of effect pigments is redundancy.

Compared to a mere visual assessment of surface coatings, the method of optical microscopy provides better flake discrimination.

This method of optical microscopy of effect color shades is frequently used in the color matching process in automotive industry. The lateral extension of platelet-like effect pigments, typically ranging between 10 to 50 µm, enables such an application. The resolution limit of optical microscopy, which is of the order of about 1 µm, is well below the typical size of special effect pigments so that they can easily be identified in a surface coating, when magnified appropriately.

Microscope imaging allows direct comparison of pigment micro features instead of comparison of appearances which depends on other factors. In this method in its most elementary approach a comparison is made by microscopic observation, or images, of the coated surface in question, with either reference samples, images of reference samples, or features derived from images of reference samples. Optical microscopy of surface coatings allows a direct comparison of micro features instead of comparison of appearances and identification of effect pigments. This is achieved by virtually detecting effect pigment properties such as size, shape, edge and surface morphology, and color.

Therefore, there is a need for an apparatus and method for characterizing effect pigment spots in images of layers.

SUMMARY OF THE INVENTION

Embodiments of the present disclosure provide, according to a first example of a first aspect, an apparatus and method for characterizing effect pigment spots in images of layers, the method comprising the steps: forming one or more point clouds of effect pigment spots, each point in the point clouds being characterized by at least three device-independent color coordinates of an effect pigment spot: a first and a second linearly projected chromaticity coordinates, and a lightness-related value; computing the distance of one or more point clouds to one or more reference point clouds; and selecting the reference point cloud with shortest distance.

Furthermore in the method of the present disclosure according to the first example of the first aspect, forming one or more point clouds may comprise forming one or more point cloud clusters. Computing the distance may comprise encoding the one or more point clouds into a hierarchical tree data structure. Computing the distance may comprise forming a point cloud envelope. Computing the distance may comprise computing the cloud's centroid projected on a plane of a chromaticity diagram. Computing the distance may comprise computing a measure of the cloud's statistical dispersion. Computing the distance may comprise the steps: computing the lightness of one or more effect pigment spots within one or more images; computing a lightness mean of effect pigment spots; computing a deviation from lightness mean of the effect pigment spots; and wherein forming one or more point clouds of effect pigment spots, the lightness equals the deviation from lightness mean. At least a first and a second linearly projected chromaticity coordinates may be computed according to the CIE 1976 standard. The value of one or more of the device-independent color coordinates may be corrected by a color value measured over a surface the size of which corresponds to that of at least nine effect pigment spots. The method may further comprise a step of comparing the point cloud to one or more reference point clouds. The images comprising effect pigment spots may be formed by applying an image processing method to the images of a layer comprising effect pigments. The images comprising effect pigment spots may be formed by applying a thresholding method to the images of a layer comprising effect pigments. Forming one or more point clouds may comprise a point clustering method. Forming one or more point clouds may comprise a step of automatically comparing the point cloud to one or more reference point clouds with a two- or more-dimensional pattern matching method. The images may share a common color calibration basis. The images may be acquired by a digital color camera. The images may be formed from combining a plurality of images acquired at different exposures. The images may be acquired at a plurality of viewing and illumination angle combinations. The method may further comprise a step of automatically comparing a plurality of point clouds acquired at a plurality of viewing and illumination angle combinations to one or more reference point clouds with a three-dimensional pattern matching method. The point clouds may be displayed on a plot comprising three or more axes, wherein a first axis is for the first chromaticity coordinate u', a second axis is for the second chromaticity coordinate v', and a third axis is for the deviation from lightness mean ($L^*-\langle L^* \rangle$) of the effect pigment spots. The centroid of the point cloud along one or more dimensions of lightness or color-opponent dimensions may be computed for one or more illumination-observation angle combination. A dataset comprising one or more centroids of the point cloud along one or more dimensions of lightness or color-opponent dimensions may be provided to a computer-based system.

Furthermore, the present disclosure provides, according to a second example of a second aspect, a method for characterizing effect pigment spots in images of layers, the method comprising: providing one or more digital cameras; providing one or more illumination sources; providing one or more electronic displays; providing a plurality of reference point clouds stored in non-volatile semiconductor memory; acquiring color image data from the digital cameras; forming one or more point clouds of effect pigment spots, each point in the point clouds being characterized by at least three device-independent color coordinates of an effect pigment spot: a first and a second linearly projected chromaticity coordinates, and a lightness-related value; computing the distance of one or more point clouds to one or more reference point clouds; and selecting the reference point cloud with shortest distance.

Furthermore, the present disclosure provides, according to a third example of the first aspect, a database for characterizing effect pigment spots in images of layers and a method for forming such a database, the database comprising: images of a layer comprising effect pigments, said images comprising a plurality of effect pigment spots formed within one or more images, each effect pigment spot characterized by at least a first and a second linearly projected chromaticity coordinates (u', v') and at least one lightness-related value $L^*$; one or more point clouds of effect pigment spots, each point in the point clouds being characterized by device-independent color coordinates (u', v', L); a distance of one or more point clouds to one or more reference point clouds; and a selection of a reference point cloud with shortest distance.

Furthermore, the present disclosure provides, in a fourth example of the first aspect, a computer-based layer analysis system for characterizing effect pigment spots in images of layers, comprising: one or more digital cameras; one or more illumination sources; one or more electronic displays; one or more central processing units; one or more non-volatile semiconductor memories comprising a stored plurality of reference point clouds; one or more non-volatile semiconductor memories storing a program comprising instructions for execution by the central processing unit for: acquiring color image data from the digital cameras; forming one or more point clouds of effect pigment spots, each point in the point clouds being characterized by at least three device-independent color coordinates of an effect pigment spot: a first and a second linearly projected chromaticity coordinates, and a lightness-related value; computing the distance of one or more point clouds to one or more reference point clouds; and selecting the reference point cloud with shortest distance.

The examples according to the first aspect of this disclosure can be defined by the following examples A to Y:

A. A method for characterizing effect pigment spots in images of layers, the method comprising the steps:

forming one or more point clouds of effect pigment spots, each point in the point clouds being characterized by at least three device-independent color coordinates of an effect pigment spot:

a first and a second linearly projected chromaticity coordinates, and a lightness-related value;

computing the distance of one or more point clouds to one or more reference point clouds which are for example each associated with a (i.e. each one, for example each exactly one) reference effect pigment; and selecting the reference point cloud with shortest distance, and for example characterizing the effect pigment spot as the reference effect pigment based on the selected reference point cloud.

B. The method of example A, wherein forming one or more point clouds comprises forming one or more point cloud clusters.

C. The method of any one of examples A to B, wherein computing the distance comprises encoding the one or more point clouds into a hierarchical tree data structure.

D. The method of any one of example A to C, wherein computing the distance comprises forming a point cloud envelope, for example a point cloud of points representing the effect pigment spots.

E. The method of any one of example A to D, wherein computing the distance comprises computing the centroid of the cloud projected on a plane of a chromaticity diagram.

F. The method of any one of examples A to E, wherein computing the distance comprises computing a measure of the cloud's statistical dispersion.

G. The method of any one of example A to F, wherein computing the distance comprises the following steps:

computing the lightness of one or more effect pigment spots within one or more images;

computing a lightness mean of effect pigment spots;

computing a deviation from lightness mean of the effect pigment spots; and wherein forming one or more point clouds of effect pigment spots, the lightness equals the deviation from lightness mean.

H. The method of according to any one of examples A to G, wherein the at least a first and a second linearly projected chromaticity coordinates are computed according to the CIE 1976 standard.

I. The method of any one of examples A to H, wherein the value of one or more of the device-independent color coordinates is corrected by a color value measured over a surface the size of which corresponds to that of at least 9 effect pigment spots.

J. The method of any one of examples A to I, wherein the method further comprises a step of comparing the point cloud to one or more reference point clouds.

K. The method of any one of examples A to J, wherein the images comprising effect pigment spots are formed by applying an image processing method to the images of a layer comprising effect pigments.

L. The method of any one of examples A to K, wherein the images comprising effect pigment spots are formed by applying a thresholding method to the images of a layer comprising effect pigments.

M. The method of any one of examples A to L, wherein the step of forming one or more point clouds comprises executing a point clustering method.

N. The method of any one of examples A to M, wherein the step of forming one or more point clouds comprises a step of automatically comparing the point cloud to one or more reference point clouds with a two- or more-dimensional pattern matching method.

O. The method of any one of examples A to N, wherein the images share a common color calibration basis.

P. The method of any one of examples A to O, wherein the images are acquired by a digital color camera.

Q. The method of any one of examples A to Q, wherein the images are formed from combining a plurality of images acquired at different exposures.

R. The method of any one of examples A to Q, wherein the images are acquired at a plurality of viewing and illumination angle combinations.

S. The method of any one of examples A to R, wherein the method further comprises a step of automatically comparing a plurality of point clouds acquired at a plurality of viewing and illumination angle combinations to one or more reference point clouds with a three-dimensional pattern matching method.

T. The method of any one of examples A to S, wherein the point clouds are displayed on a plot comprising three or more axes, wherein a first axis is for the first chromaticity coordinate u', a second axis is for the second chromaticity coordinate v', and a third axis is for the deviation from lightness mean ($L^*-\langle L^*\rangle$) of the effect pigment spots.

U. The method of any one of examples A to T, wherein the centroid of the point cloud along one or more dimensions of lightness or color-opponent dimensions is computed for one or more illumination-observation angle combination.

V. The method of any one of examples A to U, wherein a dataset comprising one or more centroids of the point cloud along one or more dimensions of lightness or color-opponent dimensions is provided to a computer-based system.

W. A method for characterizing effect pigment spots in images of layers, the method comprising:

providing one or more digital cameras;

providing one or more illumination sources;

providing one or more electronic displays;

providing a plurality of reference point clouds stored in non-volatile semiconductor memory, each of the reference point clouds being associated with a (i.e. each one, for example each exactly one) reference effect pigment;

acquiring color image data from the digital cameras;

forming one or more point clouds of effect pigment spots, each point in the point clouds being characterized by at least three device-independent color coordinates of an effect pigment spot:

a first and a second linearly projected chromaticity coordinates, and a lightness-related value;

computing the distance of one or more point clouds to one or more reference point clouds; and selecting the reference point cloud with shortest distance, and for example characterizing the effect pigment spot as the reference effect pigment based on the selected reference point cloud.

X. A database for characterizing effect pigment spots in images of layers, the database comprising:

images of a layer comprising effect pigments, said images comprising a plurality of effect pigment spots formed within one or more images, each effect pigment spot characterized by at least a first and a second linearly projected chromaticity coordinates (u', v') and at least one lightness-related value $L^*$;

one or more point clouds of effect pigment spots, each point in the point clouds being characterized by device-independent color coordinates (u', v', L);

a distance of one or more point clouds to one or more reference point clouds which are for example each associated with a (i.e. each one, for example each exactly one) reference effect pigment; and a selection of a reference point cloud with shortest distance, and for example a characterization of the effect pigment spot as the reference effect pigment based on the selection of the reference point cloud.

Y. A computer-based layer analysis system for characterizing effect pigment spots in images of layers, comprising:

one or more digital cameras;

one or more illumination sources;

one or more electronic displays;

one or more central processing units;

one or more non-volatile semiconductor memories comprising a stored plurality of reference point clouds which are for example each associated with a (i.e. each one, for example each exactly one) reference effect pigment;

one or more non-volatile semiconductor memories storing a program comprising instructions for execution by the central processing unit for:

acquiring color image data from the digital cameras:

forming one or more point clouds of effect pigment spots, each point in the point clouds being characterized by at least three device-independent color coordinates of an effect pigment spot:

a first and a second linearly projected chromaticity coordinates, and a lightness-related value;

computing the distance of one or more point clouds to one or more reference point clouds; and selecting the reference point cloud with shortest distance, and for example characterizing the effect pigment spot as the reference effect pigment based on the selected reference point cloud.

A second aspect of the present disclosure is described as follows:

In a first example of the second aspect, the present disclosure relates to a computer-implemented method for identifying an effect pigment. The method comprises executing, on at least one processor of at least one computer, the following steps.

In a (for example, first) exemplary step, sample image data is acquired which describes (for example, defines or represents) a digital image of a layer comprising a sample effect pigment. For example, the sample image data describes a shade (i.e. a combination of the color and the effect) of the layer. In one example, the sample image data describes a digital image (e.g. the appearance) of the layer comprising the sample effect pigment from a plurality of viewing directions and/or under a plurality of illumination directions.

In a (for example, second) exemplary step, sparkle point data (also called sample sparkle point data or sparkle point distribution data or sample sparkle point distribution data or sample distribution data) is determined. The sparkle point data is determined for example based on the sample image data and describes (for example, defines or represents) a sample distribution of sparkle points defined by the digital image, for example sample sparkle points representing the sparkle generated by the sample effect pigment (for example, when it is illuminated). Each sparkle point has coordinates and a value associated with each entry of the tupel of coordinates. For example, the sample distribution is defined in an N-dimensional color space, wherein N is an integer value equal to or larger than 3. For example, N=3 and for example the N-dimensional coordinate color space has orthogonal coordinate axes. The sample distribution is generally embodied by a point cloud of measured (e.g. photographed) and then calculated data points representing the sparkle of the sample effect pigment. Where in the framework of this disclosure the term of color space is used to define the coordinates of sparkle points, the term of color space is understood to define a coordinate system in which the sparkle points are defined. Such a coordinate system may be defined by more than three dimensions (i.e. more than three coordinates) if e.g. further quantities influencing the sparkle measurement are used to define the sparkle points. Such further quantities include but are not limited to the graininess of flakes effecting the sparkle and contained in the effect pigment, illumination angle, or viewing angle (the angles being defined for example relative to a measurement surface of the layer comprising the sample effect pigment). Thus, the dimensions (coordinates) are not limited to quantities defining a color or color space within its conventional sense.

In a (for example, third) exemplary step, sparkle point transformation data (also called sample sparkle point transformation data) is determined. The sparkle point transformation data is determined for example based on the sparkle point data and describes (for example, defines or represents) a transformation of the sample distribution into an (N−1)-dimensional color space. The basis of the (N−1)-dimensional color space is for example a proper (i.e. strict) subset of the basis of the N-dimensional color space. The sparkle point transformation data is determined for example by projecting the sparkle points from the N-dimensional color space into the (N−1)-dimensional color space. In other words, this example encompasses projecting the sparkle points described by the sparkle point data into a hyperplane of the space (i.e. a coordinate system such as a color space) in which the sparkle points are described by the sparkle point data. For example, the (N−1)-dimensional color space is defined as a two-dimensional plane (defined for example by u' and v' as coordinates; in one specific example, the plane may additionally be defined by a constant value of L* or L−<L*>, such as a value of 0 [zero]) and the projection has a direction perpendicular to the plane (e.g. along or at least parallel to the L*-axis). For example and in the case of N=3, the plane is parallel to two axes (e.g. the u'-axis and the v'-axis) of the three-dimensional color space which defines the two coordinates (i.e. the basis) of the two-dimensional color space and for example perpendicular to the third axis (e.g. the L*-axis or L*−<L*>-axis) of the three-dimensional color space defining (together with the aforementioned two axes) the coordinates (i.e. the basis) of the three-dimensional color space. Thus, the sparkle points described by the sparkle point data are transformed (specifically, projected) from a for example three-dimensional reference system defined by u' and v' (the two chromaticity coordinates) and (exactly) one of L* (lightness) or L*−<L*>(deviation from mean lightness) into a two-dimensional reference system defined by u' and v' and in one example a constant value (such as zero) of (exactly) one of L* and L*−<L*>. The two-dimensional reference system is also called chromaticity plane.

In a (for example, fourth) exemplary step, sparkle point distribution geometry data (also called sample sparkle distribution geometry data) is determined based on the sparkle point transformation data, for example by applying a marginal distribution/density function to the sparkle point transformation data. The sparkle point distribution geometry data describes (for example, defines or represents) a geometry, for example at least one of a shape or a hull (i.e. an envelope, e.g. a contour in two, three or more dimensions), or a center and semi-axes (e.g. a radius in case of a circular contour or spherical hull) of the sample distribution. The geometry of the sample distribution for example has a characteristic shape which may be defined or at least approximated as a basic geometric shape (such as a square or a box, or an ellipse or an ellipsoid) which may for example be defined by a characteristic quantity (also called shape parameters, such as a center and a side length, or a center and lengths of the semi-axes). In one example, the projection may be performed by setting the L*- or L*−<L*>-coordinate entry to zero, and keeping the values of the u'- and v'-coordinate entries as before for each sparkle point.

In a (for example, fifth) exemplary step, reference distribution geometry data (also called reference sparkle distribution geometry data) is acquired which describes (for example, defines or represents) a geometry of a reference distribution of sparkle points in the (N−1)-dimensional color space (i.e. the coordinates of the sparkle points making up the reference distribution are defined in the (N−1)-dimensional color space). The reference distribution geometry data is predetermined (i.e. at least one of known or fixed) and is generated for example before execution of the method according to the first example of the second aspect is executed, for example by way of comparative measurements and/or applying other analysis techniques to at least one sample (for example, a plurality of samples). For example, the reference distribution is generated by photographing a reference effect pigment (i.e. generating the sample image data for the reference pigment) having a known identity (for example, at least one of the type or the composition), generating sparkle point data and sparkle point transformation data as well as the sparkle point distribution geometry data for the reference effect pigment as described above for the sample effect pigment, and storing the resulting geometry of the sample distribution as the geometry of the reference distribution. The reference distribution is generally embodied by a reference point cloud stored in a non-transitory computer-readable storage medium, for example in a digital database. The reference distribution geometry data describes (for example, defines or represents) a geometry, for example at least one of a shape or a hull (i.e. an envelope, e.g. a contour in two, three or more dimensions), or a center and semi-axes (e.g. a radius in case of a circular contour or spherical hull) of the reference distribution. The geometry of the reference distribution for example has a characteristic shape which may be defined or at least approximated as a basic geometric shape (such as a square or a box, or an ellipse or an ellipsoid) which may for example be defined by a characteristic quantity (also called shape parameters, such as a center and a side length, or a center and lengths of the semi-axes). The characteristic shape of the reference distribution and the sample distribution are for example at least substantially the same. In one example of this step (for example, in the case of N=3), the geometry of the sample distribution is elliptical and the geometry of the reference distribution is elliptical. In another example (for example, in the case of N=4), the geometry of the sample distribution is ellipsoidal and the geometry of the reference distribution is ellipsoidal.

For example, the sparkle points of the sample distribution and the reference distribution are defined in a color space (and specifically in the same color space) defined by a (for example, one or exactly one) coordinate defining lightness $L^*$, for example a difference $L^*-\langle L^*\rangle$ between a lightness of the respective sparkle points and a mean lightness $\langle L^*\rangle$ of the sparkle points, and two coordinates defining chromaticity $u'$, $v'$ of the sparkle points.

In a (for example, sixth) exemplary step, reference distribution association data (also called reference sparkle distribution association data) is acquired which describes (for example, defines or represents) an association between the reference distribution (for example, the reference distribution with which the geometry described by the reference distribution geometry data is associated and therefore the geometry of the reference distribution) and an identifier of the reference distribution. The identifier is for example unique for the reference distribution, i.e. no other reference distribution has (within the framework of this disclosure) the same identifier. The identifier for defines the identity (for example, at least one of the type or the composition) of a reference effect pigment for which (i.e. by measuring which) the reference distribution has been generated. The identifier may have at least one of a human-readable or a machine-readable format. If it has a human-readable format, a string representing the identifier may be output on a display device for a user to visually perceive the information about the reference effect pigment. Thus, the reference distribution association data defines an association between the reference distribution and the reference pigment.

In a (for example, seventh) exemplary step, sample pigment identity data is determined based on the sparkle point distribution geometry data and the reference distribution geometry data and the reference distribution association data. The sample pigment identity data describes (for example, defines or represents) an identity of the sample effect pigment for example, in at least one of a human-readable or a machine-readable format. If it describes the identity of the sample effect pigment in a human-readable format, a string representing the identity (for example, the information about the identity) of the sample effect pigment may be output on a display device for a user to visually perceive the information about the reference effect pigment. The identity of the sample effect pigment is for example determined by comparing the sparkle distribution geometry data to the reference distribution geometry data to find a reference distribution which has a geometry which is similar to the geometry of the sample distribution, for example at least substantially similar at least within a predetermined (i.e. at least one of known or fixed) limit. The identity of the sample pigment is then determined to be the identity of the reference pigment associated with the reference distribution which is similar e.g. as per the aforementioned definition of similarity to the sample distribution.

For example, the reference distribution geometry data is acquired based on comparing the geometry of a plurality of reference distributions of sparkle points to the geometry of the sample distribution of sparkle points. In case more than one geometry of a reference distribution out a plurality of geometries of reference distributions is compared to the geometry of the sample distribution (and for example, if more than one of the geometries of reference distributions is similar to the geometry of the sample distribution e.g. within the predetermined limit), the identity of the reference effect pigment associated with the geometry of the reference distribution being closest (i.e. most similar or best-fitting) to the geometry of the sample distribution is determined to be the identity of the sample effect pigment. For example, the reference distribution geometry data is acquired based on determining, from a plurality of reference distributions of sparkle points, the reference distribution of sparkle points which best fits the sample distribution of sparkle points. For example, the best-fitting reference distribution of sparkle points is determined by optimizing a merit function which is for example defined by a weighted sum of shape parameters. Specifically, the best-fitting reference distribution of sparkle points is a reference distribution among a plurality of reference distributions for which a merit function defined by a difference between the values of shape parameters characterizing the geometry of the reference distribution on the one hand and the values of corresponding shape parameters characterizing the sample distribution on the other hand is optimal, for example minimal. The best-fitting geometry of a reference distribution therefore for example is the geometry of a reference distribution for which an optimization algorithm such as a distance optimization (minimization) algorithm outputs an optimal (i.e. best-fitting), for example minimal, result (out of a plurality of results for plural reference distributions) relative to the geometry of the sample distribution (the geometry of sample distribution being an optimization target).

For example, the geometry of the reference distribution and the geometry of the sample distribution are elliptical (e.g. circular) or ellipsoidal (e.g. spherical) and the merit function describes at least one of a distance between the centers of the ellipses or ellipsoids describing the geometry of the reference distribution and the geometry of the sample distribution, a distance between the areas of the ellipses or ellipsoids describing the geometry of the reference distribution and the geometry of the sample distribution, or a distance between the orientation angles of the ellipses or ellipsoids describing the geometry of the reference distribution and the geometry of the sample distribution. The respective distance then represents (specifically, is) the optimization criterion to be optimized (minimized) by the optimization algorithm used for comparing the at least one geometry of a reference distribution to the geometry of the sample distribution.

In a second example of the second aspect, the present disclosure relates to a computer-implemented method of selecting an effect pigment, comprising execution of the method according to the first example of the second aspect, wherein
the sample pigment identity data is determined for at least two different reference distributions, and the sample identity data describes at least two possible identities of the sample effect pigment, and
the method further comprises executing, by the at least one processor, steps of:
issuing, to an electronic display device, display data describing (for example, defining or representing) a list defining a prioritization (such as a goodness of fit between the respectively associated geometry of the reference distribution to the geometry of the sample distribution, or a measure related to that goodness of fit) of the at least two possible identities;
receiving (for example, by manual input of a user) input data for selecting, based on the displayed list, one of the possible identities.

The method according to the second example of the first aspect corresponds to use of the method according to the first example of the second aspect for manual selection of a best-fitting reference point cloud from a list of results comprising identities of reference effect pigments being candidates for the identity of the sample effect pigment. The list may be sorted by determined probability for each of the identities of reference effect pigments being the identity of the sample effect pigment, for example based on the result of the optimization algorithm applied to the respectively associated geometry of the reference distribution.

In a third example of the second aspect, the present disclosure relates to a computer-implemented method for identifying an effect pigment, the method comprising executing, on at least one processor of at least one computer, steps of:
a) acquiring sample image data describing a digital image of a layer comprising a sample effect pigment (as described above for the method according to the first example of the second aspect);
b) determining, based on the sample image data, sparkle point data describing a sample distribution of sparkle points defined by the digital image (as described above for the method according to the first example of the second aspect);
c) inputting the sparkle point data into an artificial neural network which has been trained on
reference distribution data describing a reference distribution of sparkle points in an N-dimensional color space, wherein N is an integer value equal to or greater than 3; and
reference distribution association data describing an association between the reference distribution and a reference effect pigment;
d) determining, based on the sparkle point data and the reference distribution data and the reference distribution association data and as an output of the artificial neural network, sample pigment identity data describing an identity of the sample effect pigment (the sample pigment identity data is described above for the method according to the first example of the second aspect).

In a fourth example of the second aspect, the present disclosure relates to a computer-implemented method of determining (e.g. at least one of predicting or correcting) a recipe (e.g. a formulation, specifically list of ingredients such as types of flakes) for an effect pigment, comprising execution of the method according to any one of the first or second examples of the second aspect. In a more specific example, the method according to the fourth example of the second aspect comprises executing the method according to the second example of the second aspect and executing, by the at least one processor, a step of determining the recipe on the basis of the selected identity.

In a fifth example of the second aspect, the present disclosure relates to a computer program which, when running on at least one processor of at least one computer or when loaded into the memory of at least one computer, causes the at least one computer to perform the method according to any one of the first to third examples of the second aspect.

In a sixth example of the second aspect, the present disclosure relates to a database comprising
reference distribution geometry data describing a geometry of a reference distribution of sparkle points in an N-dimensional color space, wherein N is an integer value equal to or greater than 3; and
reference distribution association data describing an association between the reference distribution and a reference effect pigment.

In a seventh example of the second aspect, the present disclosure relates to a non-transitory computer-readable program storage medium on which at least one of the program according to the fifth example of the second aspect or the database according to the sixth example of the second aspect is stored.

In an eighth example of the second aspect, the present disclosure relates to at least one computer, comprising at least one processor and a memory, wherein the program according to the fifth example of the second aspect is running on the at least one processor or is loaded into the memory, or wherein the at least one computer comprises the program storage medium according to seventh example of the second aspect.

In a ninth example of the second aspect, the present disclosure relates to a system for identifying an effect pigment, the system comprising:
a) the at least one computer according to the eighth example of the second aspect;
b) at least one electronic data storage device storing at least the reference distribution geometry data and the reference distribution association data; and
c) at least one digital imaging device (e.g. a digital camera having a color sensitivity defined for example in the RGB color space) for generating the sample image data,
wherein the at least one computer is operably coupled to the at least one electronic data storage device for acquiring, from the at least one data storage device, at least one of the reference distribution data or the reference distribution association data, and to the digital imaging device for acquiring, from the digital imaging device, the sample image data.

In higher specificity, the system according to the ninth example of the second aspect further comprises at least one illumination source for illuminating the layer, the layer comprising for example a corporeal surface on or in which the sample effect pigment is applied.

The illumination source is for example configured for directional (non-diffuse) illumination of the layer and a plurality of (directional) viewing geometries. At least one viewing geometry is used having a viewing angle close to the specular angle. Furthermore, a Kohinoor appearance instrument used by the inventors when making the invention provides assessment geometries with positive and negative aspecular angles which can be exploited to discriminate special types of high-performance interference pigments.

Definitions

The disclosed method is for example a computer implemented method. For example, all the steps or merely some of the steps (i.e. less than the total number of steps) of the method in accordance with the invention can be executed by a computer (for example, at least one computer). An embodiment of the computer-implemented method is a use of the computer for performing a data processing method. An embodiment of the computer-implemented method is a method concerning the operation of the computer such that the computer is operated to perform one, more or all steps of the method.

The computer for example comprises at least one processor and for example at least one memory in order to (technically) process the data, for example electronically and/or optically. The processor being for example made of a substance or composition which is a semiconductor, for example at least partly n- and/or p-doped semiconductor, for example at least one of II-, III-, IV-, V-, VI-semiconductor material, for example (doped) silicon and/or gallium arsenide. The calculating steps described are for example performed by a computer. Determining steps or calculating steps are for example steps of determining data within the framework of the technical method, for example within the framework of a program. A computer is for example any kind of data processing device, for example electronic data processing device. A computer can be a device which is generally thought of as such, for example desktop PCs, notebooks, netbooks, etc., but can also be any programmable apparatus, such as for example a mobile phone or an embedded processor. A computer can for example comprise a system (network) of "sub-computers", wherein each sub-computer represents a computer in its own right. The term "computer" includes a cloud computer, for example a cloud server. The term "cloud computer" includes a cloud computer system which for example comprises a system of at least one cloud computer and for example a plurality of operatively interconnected cloud computers such as a server farm. Such a cloud computer is preferably connected to a wide area network such as the world wide web (WWW and located in a so-called cloud of computers which are all connected to the world wide web. Such an infrastructure is used for "cloud computing", which describes computation, software, data access and storage services which do not require the end user to know the physical location and/or configuration of the computer delivering a specific service. For example, the term "cloud" is used in this respect as a metaphor for the Internet (world wide web). For example, the cloud provides computing infrastructure as a service (IaaS). The cloud computer can function as a virtual host for an operating system and/or data processing application which is used to execute the method of the invention. The cloud computer is for example an elastic compute cloud (EC2) as provided by Amazon Web Services™. A computer for example comprises interfaces in order to receive or output data and/or perform an analogue-to-digital conversion. The data are for example data which represent physical properties and/or which are generated from technical signals. The technical signals are for example generated by means of (technical) detection devices (such as for example devices for detecting marker devices) and/or (technical) analytical devices (such as for example devices for performing (medical) imaging methods), wherein the technical signals are for example electrical or optical signals. The technical signals for example represent the data received or outputted by the computer. The computer is preferably operatively coupled to a display device which allows information outputted by the computer to be displayed, for example to a user. One example of a display device is a standard computer monitor comprising for example a liquid crystal display operatively coupled to the computer for receiving display control data from the computer for generating signals used to display image information content on the display device. The monitor may also be the monitor of a portable, for example handheld, device such as a smart phone or personal digital assistant or digital media player or a (e.g. portable) spectroscopic measurement device (which also includes the computer).

The expression "acquiring data" for example encompasses (within the framework of a computer implemented method) the scenario in which the data are determined by the computer implemented method or program. Determining data for example encompasses measuring physical quantities and transforming the measured values into data, for example digital data, and/or computing (and e.g. outputting) the data by means of a computer and for example within the framework of the method in accordance with the invention. The meaning of "acquiring data" also for example encompasses the scenario in which the data are received or retrieved by (e.g. input to) the computer implemented method or program, for example from another program, a previous method step or a data storage medium, for example for further processing by the computer implemented method or program. Generation of the data to be acquired may but need not be part of the method in accordance with the invention. The expression "acquiring data" can therefore also for example mean waiting to receive data and/or receiving the data. The received data can for example be inputted via an interface. The expression "acquiring data" can also mean that the computer implemented method or program performs steps in order to (actively) receive or retrieve the data from a data source, for instance a data storage medium (such as for example a ROM, RAM, database, hard drive, etc.), or via the interface (for instance, from another computer or a network). The data acquired by the disclosed method or device, respectively, may be acquired from a database located in a data storage device which is operably to a computer for data transfer between the database and the computer, for example from the database to the computer. The computer acquires the data for use as an input for steps of determining data. The determined data can be output again to the same or another database to be stored for later use. The database or database used for implementing the disclosed method can be located on network data storage device or a network server (for example, a cloud data storage device or a cloud server) or a local data storage device (such as a mass storage device operably connected to at least one computer executing the disclosed method). The data can be made "ready for use" by performing an additional step before the acquiring step. In accordance with this additional step, the data are generated in order to be acquired. The data are for example detected or captured (for example by a measurement device). Alternatively or additionally, the data are input in accordance with the additional step, for instance via interfaces. The data generated can for example be inputted (for instance into the computer). In accordance with the additional step (which precedes the acquiring step), the data can also be provided by performing the additional step of storing the data in a data storage medium (such as for example a ROM, RAM, CD and/or hard drive), such that they are ready for use within the framework of the method or program in accordance with the invention. The step of "acquiring data" can therefore also involve commanding a device to obtain and/or provide the data to be acquired. In order to distinguish the different data used by the present method, the data are denoted (i.e. referred to) as "XY data" and the like and are defined in terms of the information which they describe, which is then preferably referred to as "XY information" and the like.

BRIEF DESCRIPTION OF DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, for the invention may admit to other equally effective embodiments. Also, the reference numerals denote the same features throughout the figures.

FIG. 4 is a perspective view of an apparatus for pigment identification and a block diagram for a pigment identification database.

FIGS. 5A-5C are representations combining a three-dimensional color space representation of a point cloud of effect pigment spots and a ray diagram for a plurality of measurements of a layer comprising effect pigments.

FIGS. 9A1-9D3 is a table of images presenting 4 steps in the analysis of a layer comprising effect pigments, said layer being imaged under 3 illumination-viewing angle combinations.

DESCRIPTION OF EMBODIMENTS

Embodiments of the present disclosure provide an apparatus and method for measuring, classifying, identifying, and comparing effect pigments comprised in layers. A layer may be a material having a surface from which effect pigments are visible to the eye or to an optical measuring device, for example a painted coating or a polymer sheet. The disclosure also describes an embodiment of an apparatus comprising a color imaging sensor and a processor implementing the method. The disclosure also provides a method and an apparatus to form data for forming an effect pigment reference database.

Figure 1:
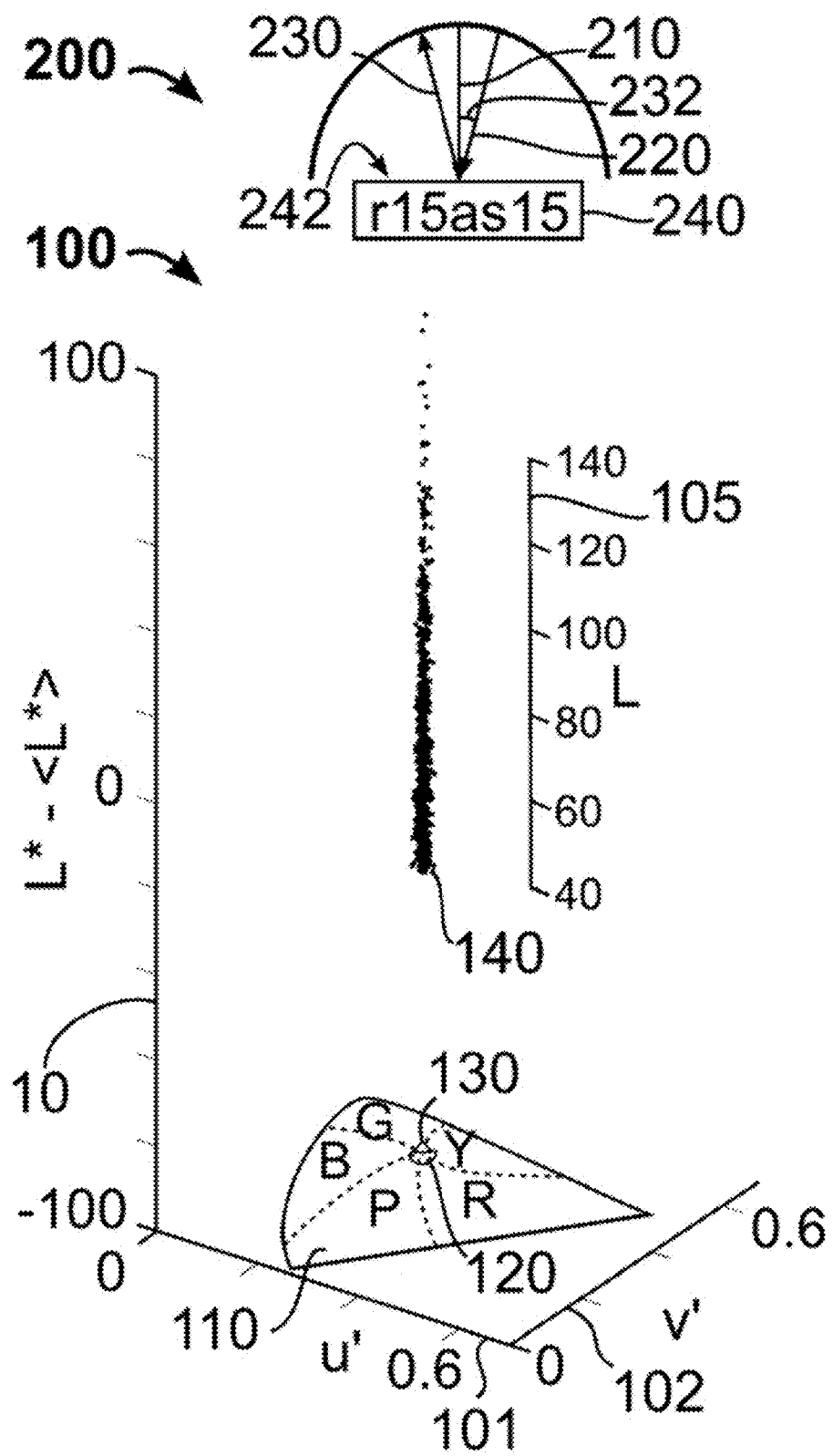
FIGS. 1 and 2 are representations combining a three-dimensional color space representation of a point cloud of effect pigment spots and a ray diagram.

FIG. 1 is an embodiment of representation combining a three-dimensional color space representation 100 of one or more point clouds of effect pigment spots and a ray diagram 200. The three-dimensional color space representation 100, abbreviated 3DCSR, comprises a first coordinate axis 101 and a second coordinate axis 102 representative of chromaticity coordinates, for example a first chromaticity coordinate, u', and a second chromaticity coordinate, V, for example derived from the CIE 1976 (L*, u*, v*) color space also known as CIELUV. Other chromaticity coordinates may be used such as x, y (for example of the CIE 1931 color space chromaticity diagram). The coordinates may be derived from other color space systems such as CIE 1976 UCS, CIEUVW, CIELAB, CIELCH, color spaces of the RGB family, color spaces of the YUV family, or other color spaces. The third coordinate axis 103 represents a value derived from the lightness of effect pigment spots within the point cloud of effect pigment spots 140. The value is derived to reduce the duration or the amount of computation needed for comparison between point clouds of effect pigment spots and may for example be a normalized value of lightness, for example a deviation from mean lightness: $L^* - \langle L^* \rangle$.

Computing deviation from mean lightness (abbreviated DML) may therefore reduce the duration or the amount of computation needed for effect pigment identification, for example upon comparison with effect pigment data comprised in a reference database 490 (show in FIG. 4).

The 3DCSR 100 may further comprise a chromaticity diagram 110, for example a (u', v') chromaticity diagram. The chromaticity diagram 110 may comprise wavelength markings, for example along its periphery. One or more chromaticity diagrams 110 may be drawn on a (u', v') plane orthogonal at one or more coordinates of the third coordinate axis 103. The chromaticity diagram may comprise an imprint 120 corresponding to a projection of the point cloud of effect pigment spots 140 onto the chromaticity diagram 110. The imprint 120 may be a processed rendering of the projection, obtained for example by applying a smoothing or region growing method. The processed rendering of the projection may for example provide a closed envelope of the projection. The processed rendering of the projection may for example provide a smoothed envelope of the projection. The chromaticity diagram may comprise an achromatic axis marker 130, for example a colored spot, a cone, or a line parallel to the third coordinate axis, to enable its visualization. The 3DCSR 100 may comprise a fourth coordinate axis 105 that is parallel to the third coordinate axis 103 to provide means for a user to obtain visual measurements of lightness in a coordinate space that is different from that of the third coordinate axis 103, for example luminance L.

The ray diagram 200 may comprise a first marker 210 for the illumination direction, for example represented in FIG. 1 as an arrow pointing perpendicularly towards the surface of the layer. The ray diagram may comprise a second marker 220 for the aspecular direction, for example an aspecular viewing direction, for example represented in FIG. 1 as an arrow pointing towards the surface of the layer, for example at an angle of 15°. The ray diagram may comprise a third marker 230 for the viewing direction, for example represented in FIG. 1 as an arrow pointing away from the surface, for example at an angle of 15°. The diagram may comprise an aspecular angle marker 232, for example represented as an arc between the first marker 210 and the second marker 220. The ray diagram may comprise a ray diagram angles box 240, the top side 242 of which may serve as a representation of the surface of the layer within the ray diagram 200. As an example for ray diagram 200, the ray diagram angles box 240 comprises the sequence r15as15 corresponding for the first part (r15) to the second marker's aspecular direction set at an angle of 15° with respect to surface normal and for the second part (as15) to the first marker's angle of 15° with respect to the second marker.

A graphical user interface displaying a representation of FIG. 1, for example implemented on a computer or on a measurement device's display, may enable a user to move the chromaticity diagram's plane in a direction parallel to that of the third coordinate axis 103, for example to obtain measurements of raw or processed values related to the cross-sectional area of the point cloud 140 intersecting the chromaticity diagram's plane 110.

Figure 2:
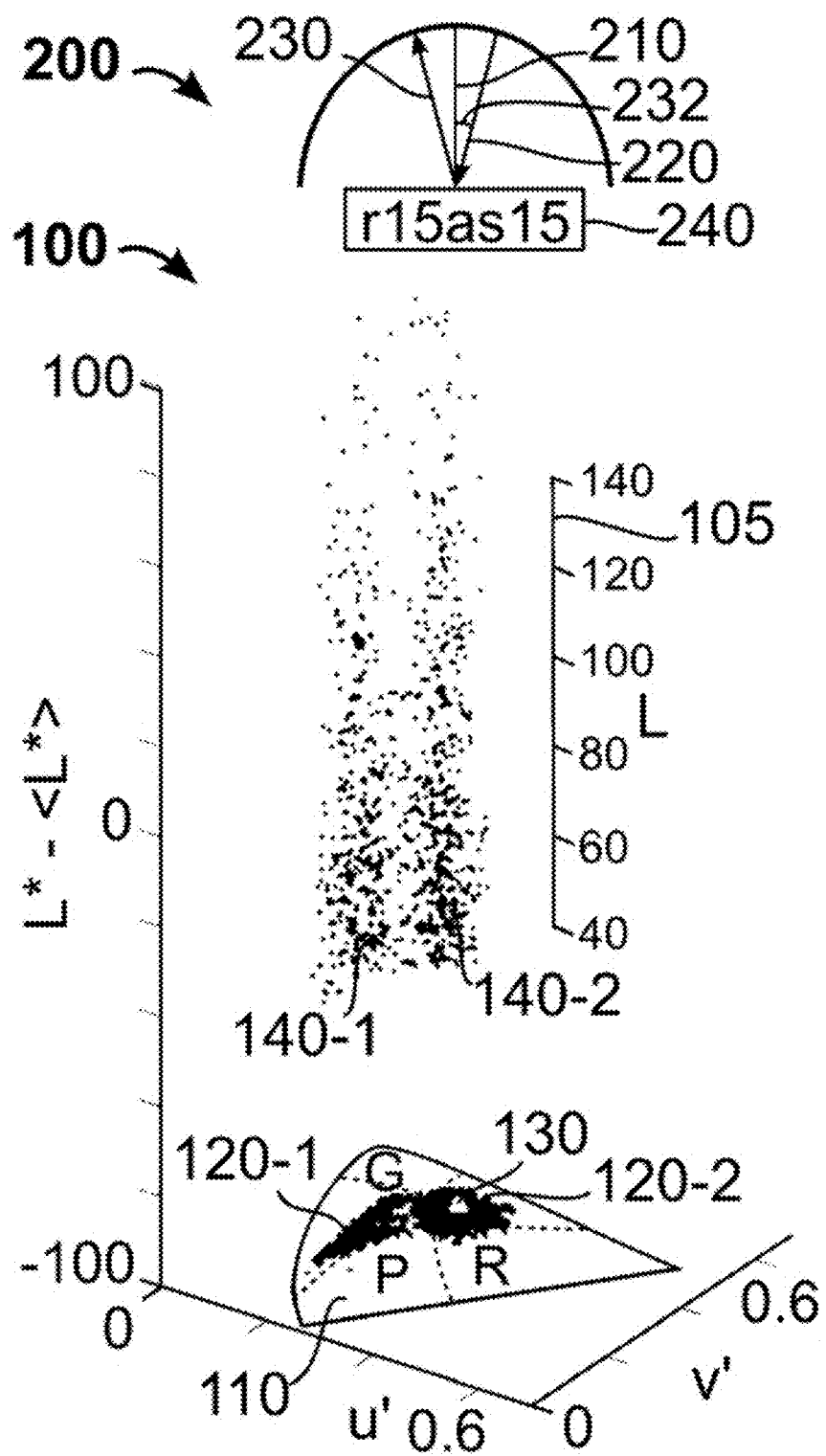

FIG. 2 presents a second embodiment of the representation presented in FIG. 1, here displaying a second set of effect pigment data forming a first and a second point clouds of effect pigment spots 140-1 and 140-2, respectively, each of which is projected as a first and a second projection of effect pigments spots 120-1 and 120-2, respectively, onto the chromaticity diagram 110.

Figure 3:
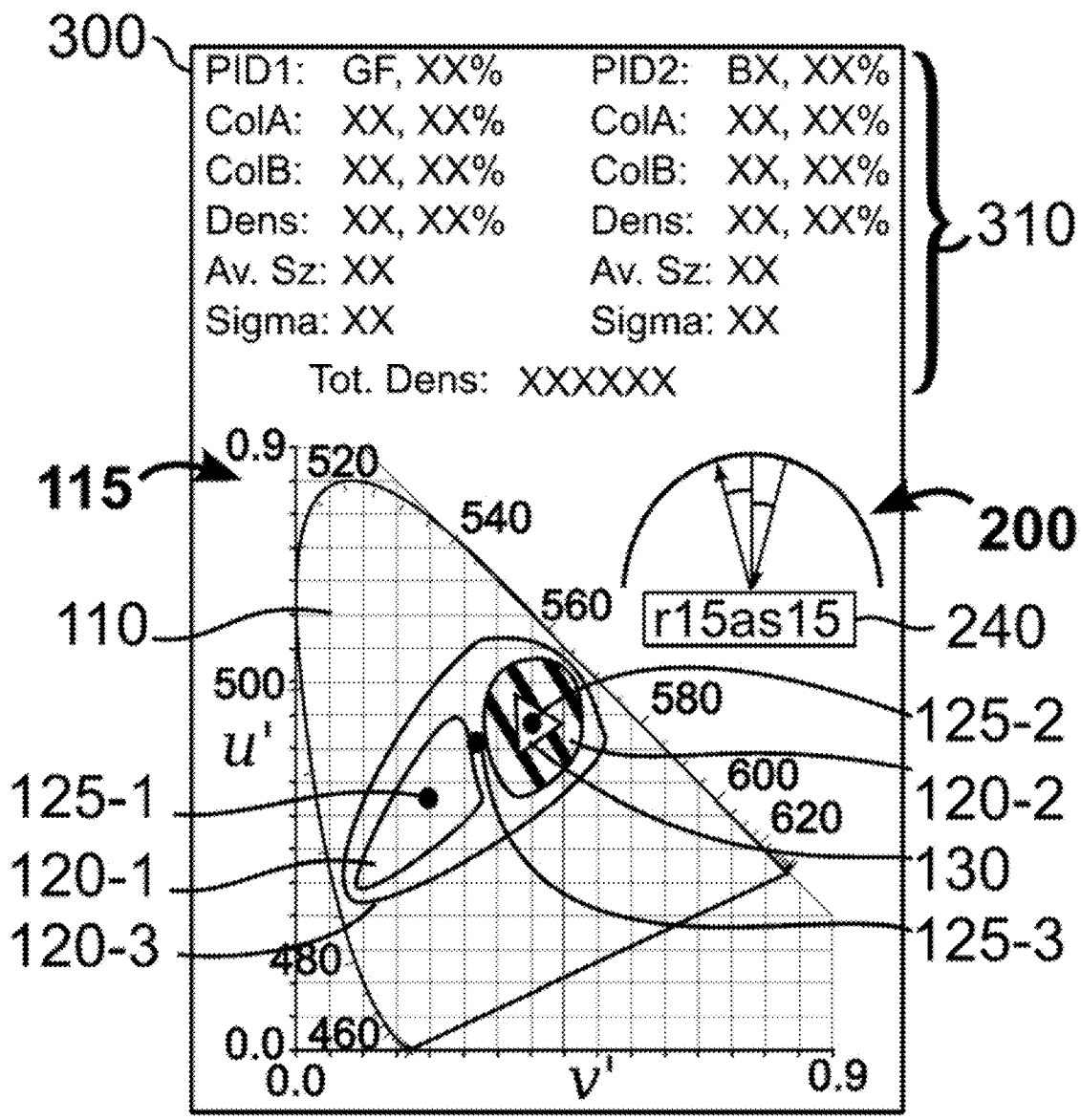
FIG. 3 is a display combining a chromaticity diagram, a ray diagram, and numerical data.

FIG. 3 presents an integrated display 300, for example to be displayed on a computer or on a measurement device's display. The integrated display 300 may comprise one or more statistical data areas 310, one or more graphical data areas 115, or one or more ray diagrams 200. The statistical data area 310 may present information items related to the one or more point clouds 140-1, 140-2, or their projections 120-1, 120-2, for example: one or more effect pigment identification names or references; the relative content of said effect pigment comprised within the layer, for example expressed as a percentage; the relative ratio of a first effect pigment with respect to a second effect pigment, for example expressed as a percentage; the coordinates of the centroids of one or more point clouds; the coordinates of the centroids of a cross section of the one or more point clouds intersected by a chromaticity plane, such as a (u', v') plane; the areal or volumetric density of one or more point clouds; the average size of spots that form the one or more point clouds; the raw or processed measured area of the projection of the one or more point clouds onto the chromaticity diagram; the raw or processed measured area of the intersection of the one or more point clouds onto the chromaticity diagram; the variance or other statistical measure of one or more of the presented information; or the aggregate over a plurality of point clouds of one or more of the presented information. The information presented may relate to a measured point cloud 140-1, 140-2 or originate from data stored in a reference database 490.

The graphical data area 115 may present a chromaticity diagram 110 comprising one or more projections or cross-sections 120-1, 120-2, 120-3 of measured data or stored reference data for effect pigment point clouds. The graphical data area 115 may present respective centroids 125-1, 125-2, 125-3 of projections or cross-sections 120-1, 120-2, 120-3. The projections or cross-sections may be displayed as having one or more processed contours that are smoother than a raw projection or cross-section of the point clouds. The processed contours may for example be obtained by transforming the raw projections or cross-sections using two-dimensional or three-dimensional methods such as: smoothing filters, for example Gaussian-based or kernel-based filters; or image segmentation methods, for example simulated annealing methods or watershed methods. The graphical data area 115 may advantageously reduce the time needed by an operator to verify that results provided by an automated effect pigment analysis system 700 (presented in FIG. 7) are correct. The graphical data area 115 may advantageously enable an operator to make direct measurements using displayed information. For example, an operator may compare graphically or numerically the positions, for example based on displayed coordinates, of measured centroids 125-1, 125-2 to those of reference effect pigments data stored in a reference database 490.

Figure 7:
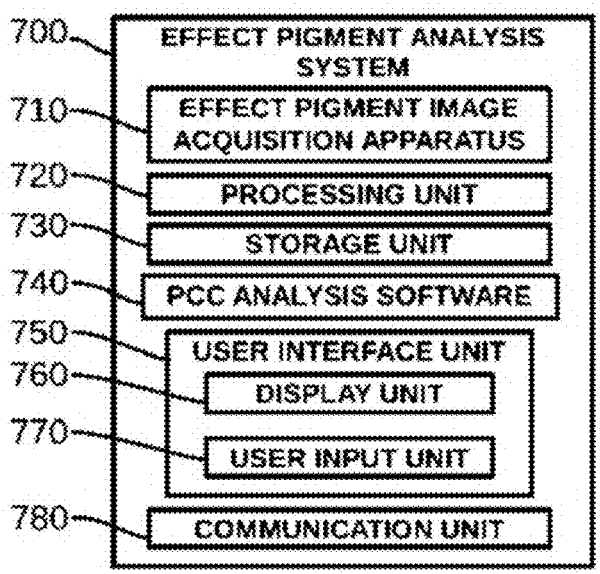
FIG. 7 is a block diagram for a system for effect pigment identification.

FIG. 4 presents a perspective view of a handheld apparatus 400 for measuring, classifying, identifying, and comparing effect pigments comprised in surface layers. The handheld apparatus 400 may comprise a housing 410, for example designed to be ergonomically shaped and a handle portion 420 that may comprise one or more human interface sensors such as touch sensors, pressure sensors, or switches enabling interaction with the measurement process or information displays. The apparatus 400 may comprise one or more display screens 430, for example a touch-sensitive screen that may enable an operator to interact with the measurement process or the information displayed. The apparatus 400 may comprise one or more human interface sensors 440, for example a tactile sensor, for example a 5-way switch. The apparatus 400 may comprise an imaging and illuminations subsystem 450 (not shown) that is entirely or partially enclosed within the housing 410. The apparatus 400 may comprise one or more processing units 720 and one or more storage units 730 (FIG. 7).

The handheld apparatus 400 may operate in relationship with a reference database 490. The reference database 490 may be stored within non-volatile memory of the handheld apparatus, for example comprised in storage unit 730. The database 490 may be stored in the storage unit 730, for example in non-volatile memory, of a distant computer system and be accessible via wired or wireless communication. The database may comprise appearance parameters 495 related to reference effect pigment spot clouds, for example one or more items of information displayable in the statistical data area 310, the graphical data area 115, or the ray diagram 200. The appearance parameters my further comprise texture-related parameters, sparkle grade-related parameters, sparkle spot-related parameters, angle-dependent parameters, or depth-related parameters. The database may comprise reference images 497, for example point cloud images or images of layers, for example images of layers shown in FIG. 9A1 to 9D3. The data, for example images or appearance parameters, acquired or formed by the handheld apparatus 400 may be stored within the reference database 490. The reference database 490 may therefore be read from or written to by the handheld apparatus. Furthermore, images or appearance parameters, acquired or formed by the handheld apparatus 400 may be used to update data stored in the database 490.

Figure 5B:
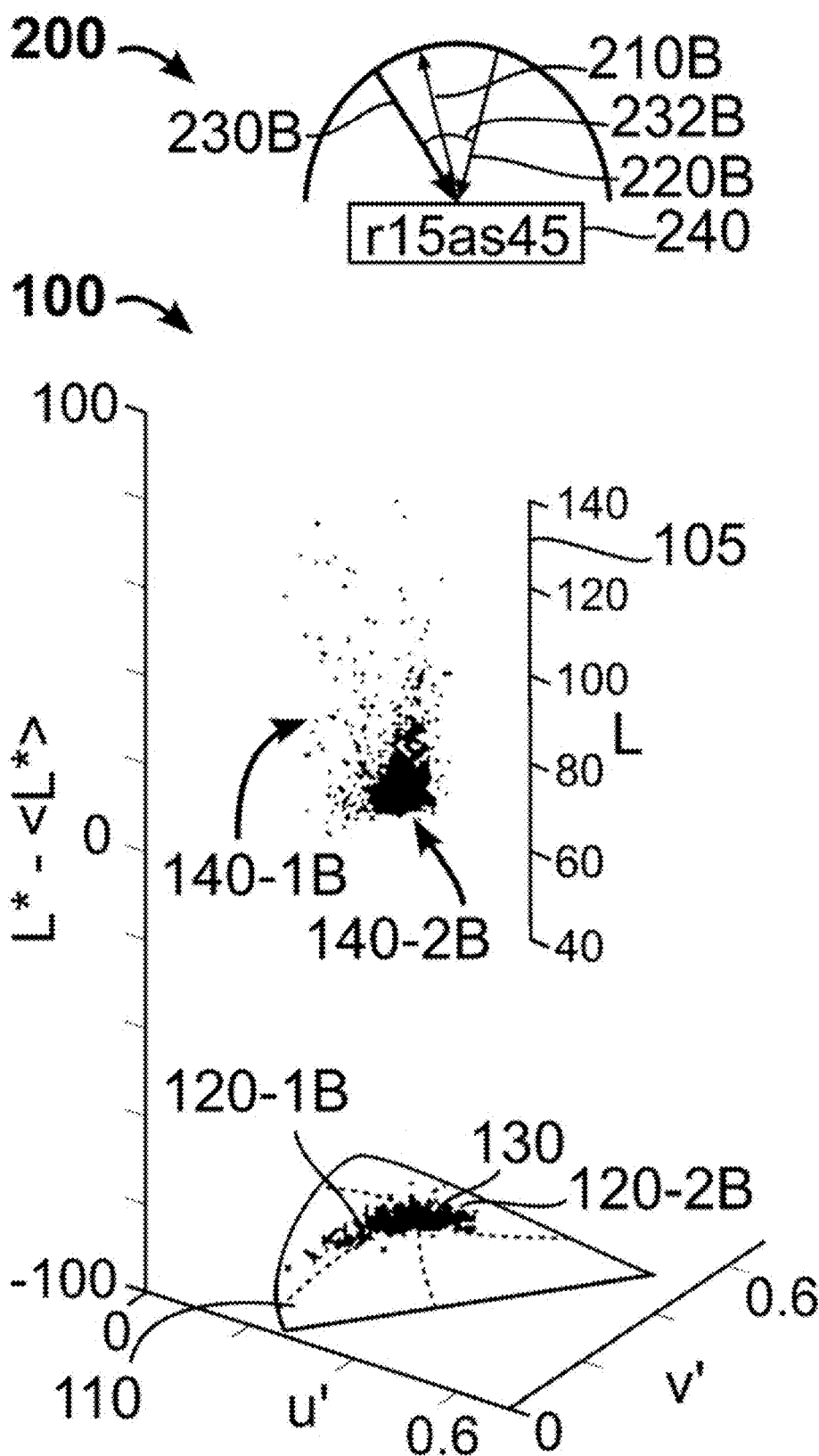
Figure 5C:
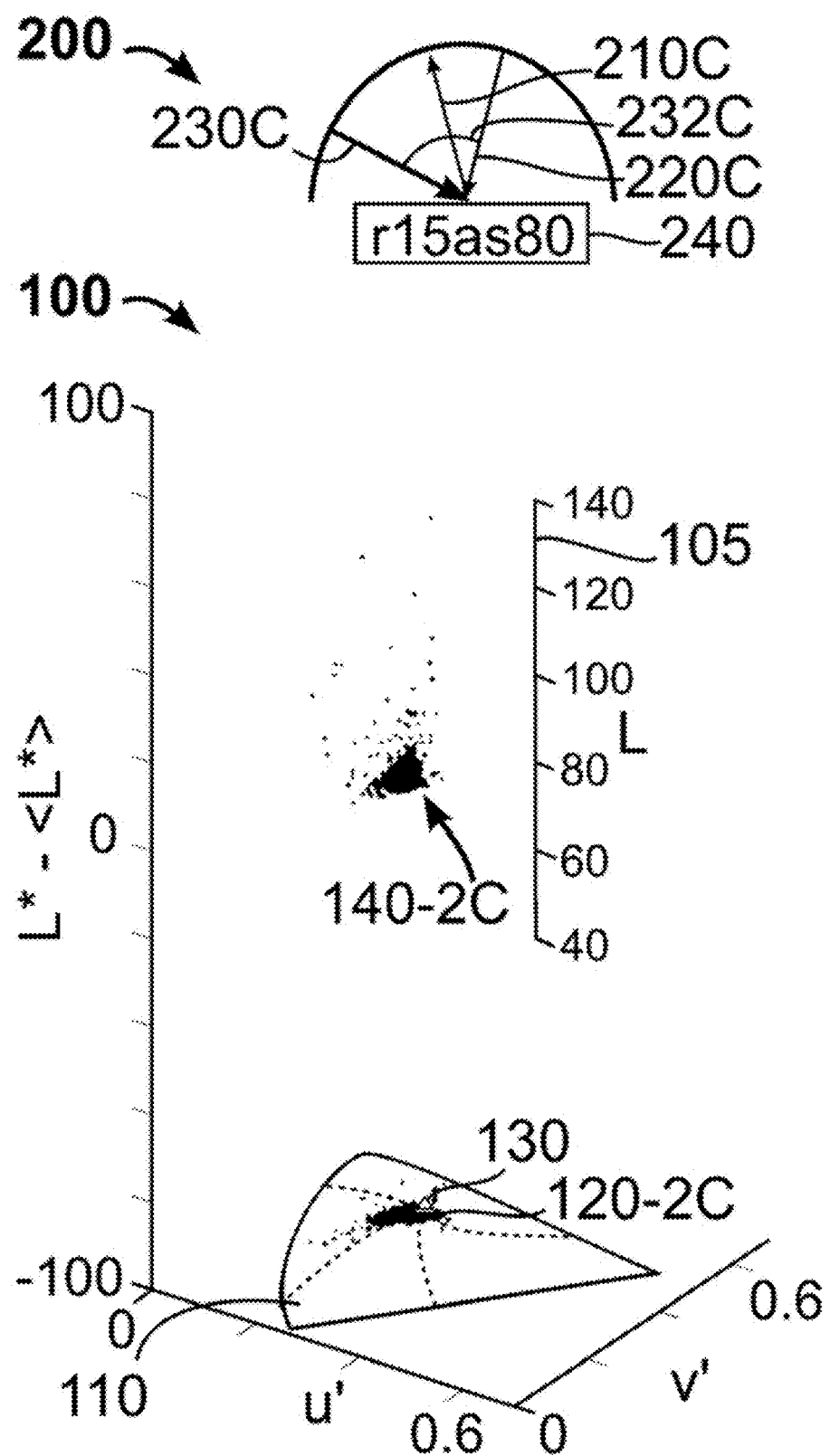

FIGS. 5A, 5B, 5C present three 3DCSR and ray diagram representations for data acquired from a layer comprising effect pigments. Each of the representations display data acquired under different illumination and viewing angle combinations, for example with respect to a normal from the surface of a coated sample comprising effect pigments. FIG. 5A is a reproduction of FIG. 2 where variable data elements acquired at illumination and acquisition setting r15as15, namely 210, 220, 230, 232, 120-1, 120-2, 140-1, and 140-2 have been renamed 210A, 220A, 230A, 232A, 120-1A, 120-2A, 140-1A, and 140-2A, respectively. FIG. 5B presents data for the same layer as that presented in FIG. 5A, the difference with the data in FIG. 5A is that data is here acquired at setting r15as45, thereby resulting in respective elements 210A, 220B, 230B, 232B, 120-1B, 120-2B, 140-1B, and 140-2B. FIG. 5C presents yet more data for the same layer as that presented in FIG. 5A, here acquired at setting r15as45, thereby resulting in respective elements 210C, 220C, 230C, 232C, 120-2C, and 140-2C.

An apparatus for measuring, classifying, identifying, and comparing effect pigments comprised in surface layers may therefore present one or more representations presenting data acquired at one or more settings as those presented in FIGS. 5A, 5B, 5C for a given layer comprising effect pigments. The apparatus, for example a computer comprising a display or a handheld apparatus 400 may present the representations of FIGS. 5A, 5B, 5C in a sequence, for example at a speed providing the impression of an animated sequence. In a corresponding way, the integrated display 300 may display a sequence or animated sequence of measurements in the form of data, statistical results, and graphical results as described for FIG. 3. The ability to quickly navigate through a set of measurements acquired under a plurality of geometry settings may advantageously provide to a user improved means to identify effect pigments in layers. Furthermore, if a large enough set of data are available, for example spot clouds, acquired under a plurality of geometry settings, a smoothly animated sequence may be presented to an operator via data interpolation, for example by tracking individual spots acquired between a first geometry setting and a second geometry setting, or for example by using graphical morphing methods. An automated or semi-automated effect pigment identification method may benefit from the added dimension provided by data acquisition under a plurality of geometry settings, as highlighted in FIGS. 10-1L to 10-2B.

Figure 6:
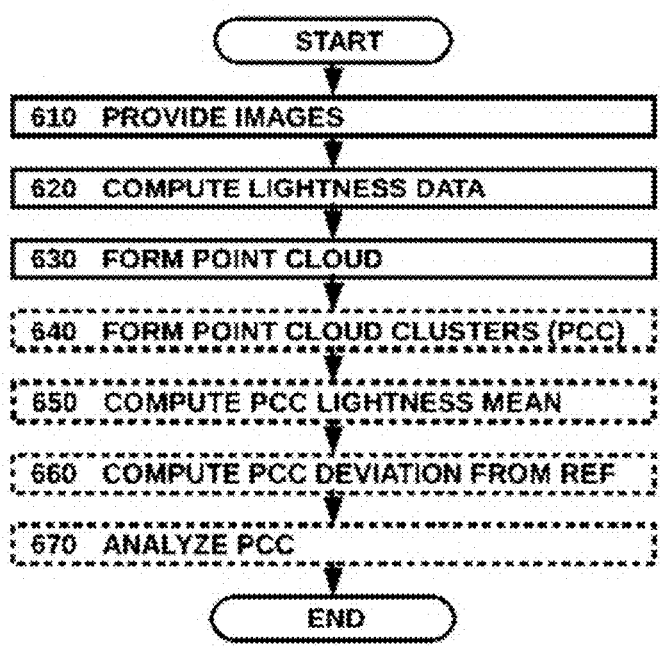
FIG. 6 is a flowchart for a method for effect pigment identification.

FIG. 6 presents steps of a method 600 $t$ for identifying effect pigments comprised in a layer 600. The steps of the method may be stored within non-volatile memory storage of a computer. The method comprises a step of providing images 610 wherein one or more images of layers are provided. For example, the images may be acquired by the handheld apparatus 400, by another apparatus (not shown) for the acquisition of images of layers, or be downloaded from a database, An apparatus for the acquisition of images of layers is preferably an imaging system capable of obtaining images of a layer under a plurality of imaging and illumination angles, for example angles measured with respect to a normal to the surface of the layer. For example, the images may be obtained using a goniometric photographic apparatus. Another apparatus for acquiring the images may comprise a plurality of photographic cameras arranged to view the layer under a plurality of angles. The images may be obtained as single shot images or may be synthetic images formed by combining images acquired under a plurality of exposures, such as so-called high dynamic range (HDR) images. Exemplary embodiments of such images are presented in FIGS. 9A1, 9A2, 9A3. The images may be obtained directly using a so-called high dynamic range imaging sensor. The images may be of a portion of a layer or the totality of a layer. The images preferably cover an identical portion of the layer or overlap each other to an extent greater than 30%, such as greater than 50%, such as greater than 80%. The images may be stitched together to form a stitched image covering a larger viewfield.

Expressed programmatically, step 610 may correspond to: for a range of illumination angles with respect to the layer's surface; for a range of viewing angles with respect to the sample's surface: acquire one or more color images of a portion of the sample surface. The color image may be obtained using one or more color imaging sensors or may be formed by using a plurality of images acquires using one or more monochromatic imaging sensors imaging the layer in turn through a plurality of filters, such a red, green, and blue filters. The imaging sensors may comprise a linear array of photoreceptors, such as a one-dimensional array, or a two-dimensional array of photoreceptors. The images may be acquired as part of an imaging sequence, for example a movie. The imaging sequence may be acquired under constant or changing conditions such as changes in: lighting conditions; lighting wavelength; lighting polarization; spatial lighting conditions; camera position; camera angle; camera distance from layer; camera lens magnification; camera lens focus; or light filtering between layer and camera sensor, such as filter color or filter polarization. In the following, an image may be an image from a sequence of images or an image aggregated from a plurality of images. All or part of the images may be subject of the steps of the method.

The method 600 comprises a step 620 of computing lightness data of features within the image. For example, for the application of identifying effect pigments in a layer, the step 620 may comprise computing the lightness of pixels within effect pigment spots in the image. As a further example, step 620 may comprise computing the average lightness of pixels within effect pigment spots in the image. In this step, the image may be converted, from for example red-green-blue (RGB) image values, into standardized and calibrated device-independent XYZ tristimulus values. An estimate of the average image color may be computed. Alternatively or in conjunction, a measure of the background color may be acquired, for example using a spectrophotometer. The average image color or the background color may be subtracted from the image. The luminance channel of the image may be filtered. For example the filtering may be a thresholding adjusted to augment the contrast of effect pigment spots, thereby forming raw spots as white dots against black background. The raw spots are shown in FIGS. 9B1, 9B2, 9B3 as black dots against a white background, a negative image prepared for printing and clarity of this disclosure. The image comprising raw spots enables the detection and location of effect pigment spots, for example by detecting spots in the image using their grey level value above a threshold. Described programmatically, computing lightness data comprises: for each (illumination angle, viewing angle) pair of which images the lightness is to be computed; for each pixel within a raw spot: compute coordinates (u', v') such that:

$$u' = \frac{4X}{X + 15 + 3Z}, v' = \frac{9Y}{X + 15 + 3Z};$$

compute the CIELUV lightness L* where: with $$L^* = 116 f(Y/Y_n) - 16,$$

$$f(Y/Y_n) = \begin{cases} (Y/Y_n)^{1/3} & \text{if } (Y/Y_n) > (24/116)^3 \\ (841/108)(Y/Y_n) + 16/116 & \text{if } (Y/Y_n) \le (24/116)^3 \end{cases},$$

and where X, Y, Z denote tristimulus values and Y % denotes a luminance of a reference white point. The average of each of u', v', and L* may be computed for each pigment spot and used in subsequent computations, each as a representative value of a given spot. A further value that may be computed is $\langle L \rangle$, the mean of lightness L* of all effect pigment spots. Yet a further value that may be computed is $L^*-\langle L^* \rangle$, the deviation from mean lightness.

The method 600 comprises a step 630 of forming one or more point clouds of spots, for example by plotting the values of u', v', and $L^*-\langle L^* \rangle$ in a three-dimensional coordinate frame as presented in FIGS. 1, 2, and 5A to 5C. Forming point clouds or other computational steps may be done for each (illumination angle, viewing angle) pair. Furthermore, to advantageously reduce the computational effort, forming point clouds or other computational steps may be done for each of a subset of (illumination angle, viewing angle) pairs that may be identified as comprising most of the information relevant to the identification of effect pigments comprised in the layers that have been imaged.

The method 600 may comprise a step 640 of forming point cloud clusters (PCC) from the point cloud of spots formed at step 630 of forming a point cloud of spots. Forming point cloud clusters may be using one or more clustering methods, for example: a k-means method, for example the k-means++ method; a principal component analysis (PCA) method; a region growing method, for example based on forming a grid in the (u', v') plane, and deriving one or more statistical values representative of the occupancy of grid cells by spots or (u', v') plane-projected spots. The grid may for example have a 64×64 resolution to cover the surface of the chromaticity diagram. The grid may be centered onto the white point of the chromaticity diagram. Each clustering method may be preceded or supplemented by an outlier detection step. Outlier detection may be performed in, for example, a two-dimensional plane, such as the (u', v') plane, or a multi-dimensional space, such as the three-dimensional (u', v', $L^*-\langle L \rangle$) space.

The method 600 may comprise a step 650 of computing the mean lightness of each point cloud clusters: $\langle L^* \rangle_{PCC}$. The step 650 may also include computing the mean lightness of a plurality of point cloud clusters. The method 600 may comprise a step 660 of computing the deviation from mean lightness of each point cloud clusters: $L^*_{PCC}-\langle L^* \rangle_{PCC}$. The step 660 may also include computing the deviation from mean lightness of a plurality of point cloud clusters.

The method 600 may comprise a step 670 of analyzing one or more point cloud clusters. The step 670 of analyzing one or more point cloud clusters may be accomplished by a point cloud cluster analyzer 740 (FIG. 7), for example implemented as software, as software loadable from non-volatile memory, or as a dedicated electronic circuit, for example implemented using field-programmable gate array (FPGA) technology or an electronic very large scale integrated (aVLSI) circuit technology. An automatic pigment identification method may be used for the analysis. The automatic effect pigment identification method may for example use a two-dimensional pattern matching method, for example by dividing the (u', v') plane into a plurality of cells, for example a uniform grid of cells, and feeding a value computed for each cell, for example a value characterizing the occupancy of the cell by one or more spots or projected spots, for example in one embodiment a continuous value relative to the areal occupancy, or for example in another embodiment a binary value triggered by an occupancy area threshold, into an artificial neural network (ANN). In essence, the classifier computes a distance of one or more point clouds, for example formed from acquiring images of layers, to one or more reference point clouds. Other inputs to the classifier may include: measurement of skewness, for example based on moments with respect to achromatic axis; or bivariate scatter ellipses, for example using the coordinates of their foci. The automatic effect pigment identification method may for example use a three-dimensional pattern matching method, for example by dividing the three-dimensional (u', v', $L^*-\langle L^* \rangle$) space into uniform or non-uniform voxels (for example based on a k-d tree or an octree) and, similarly to the two-dimensional method, feeding a value for each voxel into a pattern matching method, for example an ANN.

The automatic effect pigment identification method may for example use a four- or five-dimensional pattern matching method, for example using a four- or five-dimensional space defined by (u', v', $L^*-\langle L \rangle$, ray geometry). The ray geometry characterizes the angles of the imaging apparatus and the lighting with respect to the layer being imaged or with respect to each other, for example r15as15, r15as45, r15as80, an exemplary embodiment is presented FIGS. 10-1L to 10-2B. The four- or five-dimensional space may be divided into a four- or five-dimensional voxel space, feeding a value for each voxel into a pattern matching method, for example an ANN.

The classifier, for example an artificial neural network, may compare its input derived from data measured using the apparatus 400 with effect pigment data stored in reference database 490. For example measured data and stored data may be compared in real-time by the classifier upon measurement using the apparatus 400. Alternatively, measured data and stored data may be compared after one or more measurements using the apparatus 400. The classifier may be executed on a processing unit 730 comprised or embedded within the apparatus 400, on a processing unit external to the apparatus 400, or on a combination of embedded and external processing units. An artificial neural network classifier, may store a portion or the entirety of the reference database 490 as weights (i.e. the weights of the artificial neural network). The weights and the connective structure of the artificial neural network may be stored in non-volatile memory. In one embodiment, the artificial neural network may be implemented as a field-programmable gate array (FPGA) circuit. In another embodiment, the artificial neural network used for effect pigment classification may be implemented as an analog electronic very large scale integrated (aVLSI) circuit.

The output data 860 output by the step 670 of analyzing one or more point clouds may comprise: the identity 850 (FIG. 8) of one or more effect pigments corresponding to one or more point cloud clusters; a value or a qualifier related to the level of confidence, for example the probability, of the identity of each of to one or more point cloud clusters; a value related to (for example, defining) the grade 854 or coarseness of each of the effect pigments identified or not identified in the layers; a qualifier related to (for example, defining) the grade or coarseness of each of the effect pigments identified or not identified in the layers, for example grade qualifiers such as 'extra fine', 'fine', 'medium', or 'coarse'; an effect pigment class 852, for example related to (for example, defining) the material or morphology of the pigment or pigment flakes, examples of which may be aluminium flakes, inorganic or organic-coated flakes, interference pigment classes, examples of which may differ in substrate such as mica, synthetic aluminium-oxide, synthetic borosilicate, synthetic silica flakes, aluminium, or liquid crystal polymers; and a table, for example a spreadsheet, listing all detected effect pigment types and corresponding output data of the step 670 of analyzing one or more point clouds. Further output data may include statistical data related to average spot size, variance in spot size, or statistical dispersion, for example expressed using a Gini coefficient. One or more data 860 output by the goniometric pigment classifier may be stored in the reference database 490.

FIG. 7 presents a block diagram for an embodiment of an effect pigment analysis system 700. The embodiment may be one or more handheld apparatus 400 of FIG. 4, one or more apparatuses comprised in a system, for example a system for forming coating layers or verifying the quality of coating layers, for example coating layers on automotive systems. In one embodiment, the effect pigment analysis system 700 may be embedded in a handheld apparatus that provides image acquisition and analysis functions. In another embodiment, the effect pigment analysis system 700 may be a system comprising independent, for example part of which are comprised in separate housings, acquisition, processing, storage, display, and analysis components. The system may comprise an effect pigment image acquisition apparatus 710. The effect pigment image acquisition apparatus 710 may be a handheld apparatus, a digital camera, a purpose-built system comprising a plurality of imaging devices arranged over a plurality of locations so as to view a sample under a range of viewing angles, or a system comprising at least one goniometrically mobile imaging apparatus. The system 700 may for example be entirely or partly comprised in a robotic system, for example a robotic system comprising a manipulator with the effect pigment image acquisition apparatus 710 comprised within an end effector of the manipulator. The effect pigment analysis system 700 may comprise a processing unit 720, a storage unit 730, a point cloud cluster analyzer 740, a user interface unit 750 which may comprise a display unit 760 and a user input unit 770, and a communication unit 780.

The effect pigment analysis system, for example its processing unit 720 or its storage unit 730, may include a central processing unit (CPU) (not shown), memory (not shown), and support circuits (or I/O) (not shown). The CPU may be one of any form of computer processors that are used in low power mobile electronic devices, embedded electronic devices, general purpose computers, or computers used in industrial settings for the measurement of layers, coatings, or optical features at or near the surface of materials. The memory is connected to the CPU, and may be one or more of a readily available memory, such as flash memory, random access memory (RAM), read only memory (ROM), floppy disk, hard disk, or any other form of digital storage, local or remote. Software instructions and data can be coded and stored within the memory for instructing the CPU. The support circuits are also connected to the CPU for supporting the processor in a conventional manner. The support circuits may include cache, power supplies, clock circuits, input/output circuitry, subsystems, and the like. A program (or computer instructions) readable by the effect pigment analysis system determines which tasks or steps for identifying effect pigments are performable. Preferably, the program is software readable by the effect pigment analysis system 700 or one or more of its computer-based components.

In some embodiments, the point cloud cluster analyzer 740 may be implemented as a software program loadable from non-volatile memory comprised in the storage unit 730 into the processing unit 720. In other embodiments, the point cloud cluster analyzer 740 may be implemented as one or more dedicated electronic devices: for example, comprising processors dedicated to multi-dimensional processing such as one or more graphical processing units; or as another example, field-programmable gate array (FPGA) technology devices; or as yet another example, electronic very large scale integrated (aVLSI) circuit technology devices.

The user interface unit 750 may comprise a display unit 760, for example a tactile display (e.g. a touchscreen) that may also act as part or totality of the user input unit 770, that may enable an operator to interact with the measurement process or the information displayed. An operator may for example use the user interface unit to rotate or zoom into the three-dimensional color space representation 100 or the graphical data area 115. An operator may browse through a set of measurements acquired at a range of illumination and viewing angles, the value of which is presented in the ray diagram angles box 240, by dragging, for example using a finger against the display or a mouse, the first, second, or third markers 210, 220, 230 comprised in ray diagram 200. The user input unit 770 may comprise one or more buttons, tactile displays, or tactile sensors, examples of which have been mentioned in reference to the handheld apparatus 400.

The communication unit 780 may comprise wired or wireless communication devices enabling real-time transfer during measurement or post-measurement transfer of data to and from a database, for example reference database 490.

Figure 8:
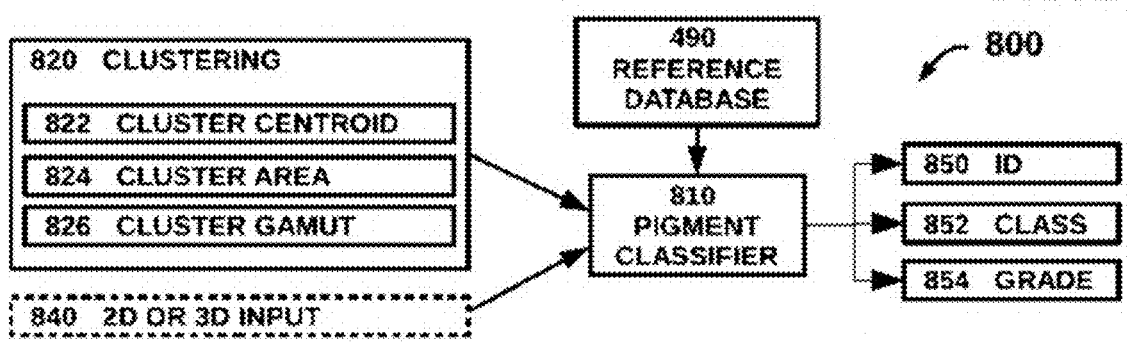
FIG. 8 is a flowchart for a computer-based method for effect pigment identification.

FIG. 8 presents a block diagram for an effect pigment classification method 800. The effect pigment classification method 800 comprises a clustering method 820 and may comprise a two-dimensional or three-dimensional input 840 feeding two- or three-dimensional spot data (for example coordinates, statistical distribution) into an effect pigment classifier 810. The effect pigment classifier 810 may for example be implemented within the point cloud cluster analyzer 740. The effect pigment classifier 810 may exchange data with, for example receive data from, the reference database 490. The clustering method comprises forming: one or more cluster centroids 822 (an exemplary embodiment of which is plotted in FIGS. 10-1L to 10-2B); one or more cluster area values 824, for example: the area of the cluster projected onto the chromaticity diagram 110 or the surface of the cluster's envelope; and a cluster gamut 826, for example a (u', v'), (u*, v*), (c, h), or (L*-related, a*, b*) gamut computed for each cluster. The effect pigment classifier 810 outputs results 860, for example: pigment identity 850, pigment class 852, or pigment grade 854. The results 850, 852, 854 may include values, for example indicating the level of confidence of a result. The effect pigment classifier 810 may operate with two-dimensional data, for example two-dimensional coordinates of the cluster of spots 140, 140-1, 140-2 projected onto the chromaticity diagram 110 in the u', v' plane (or a, b plane in a CIELAB L*a*b* color space), or may operate on three-dimensional data, for example in (u', v', $L^*$-$\langle L^* \rangle$) space.

FIGS. 9A1 to 9D3 are images, arranged in a table, presenting 4 steps in the analysis of a layer comprising effect pigments, said layer being imaged under 3 illumination-viewing angle combinations. The images may share a common calibration basis. The images may for example have been acquired by one or more color digital cameras. FIGS. 9A1 to 9D3 are images of gonioapparent blue color layers comprising effect pigments. The images are acquired (photographed) at r15as15 (first column FIGS. 9A1, 9B1, 9C1, 9D1), r15as45 (second column FIGS. 9A2, 9B2, 9C2, 9D2), and r15as80 (third column FIGS. 9A3, 9B3, 9C3, 9D3). The first row of images 9A1, 9A2, 9A3 may be acquired, for example photographed, using a scanning sensor or a two-dimensional array sensor, as single shot images or may be synthetic images formed by combining images acquired under a plurality of exposures, such as so-called high dynamic range (HDR) images.

The second row of images 9B1, 9B2, 9B3 is formed, for example by converting the images to grey-scale images and filtering them, for example by thresholding, thereby forming black images with white spots. The images are presented in this disclosure as negative images (white images with black spots) for printing and clarity. The third row of images 9C1, 9C2, 9C3, so-called sparkle-free images, is formed by subtracting the second row of images (the black images with white spots version) from the first row of images. The third row of images 9D1, 9D2, 9D3, so-called sparkle pattern images, is formed by masking the first row of images with the second row of images (the black images with white spots version).

Figures 1L, 10:
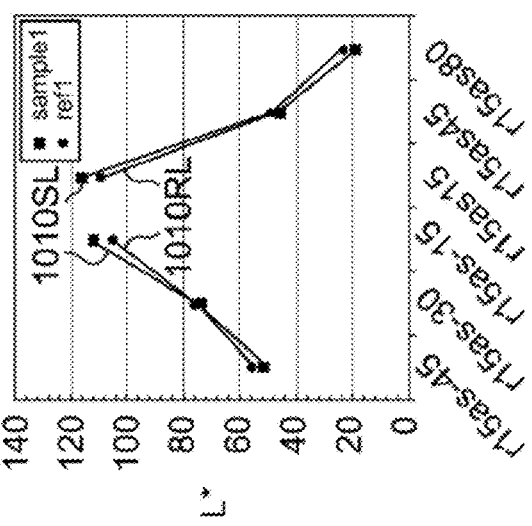
FIGS. 10-1L-10-2B is a table of goniometric centroid plots for a first sample and reference layers and a second sample and reference layers comprising effect pigments.
Figures 1A, 10:
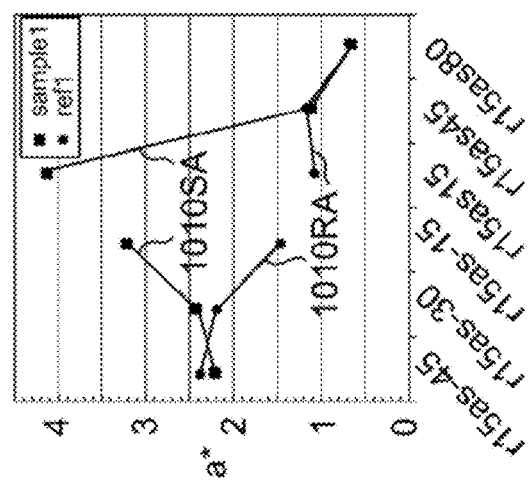
Figures 1B, 10:
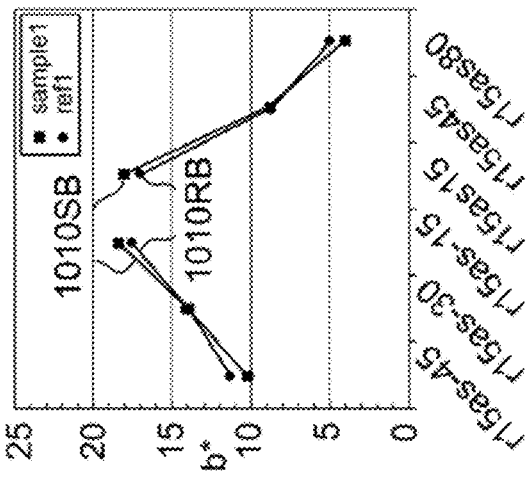
Figures 2L, 10:
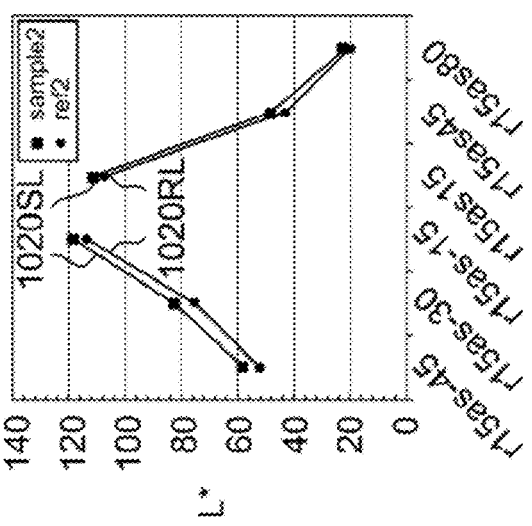
Figures 2A, 10:
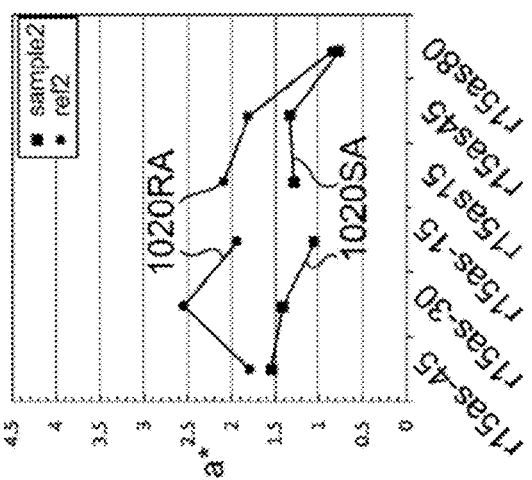
Figures 2B, 10:
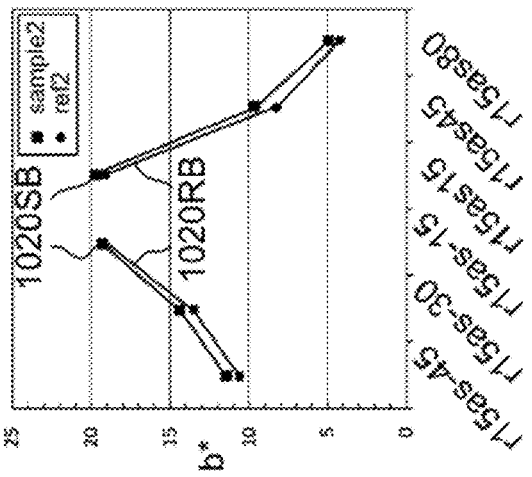

FIGS. 10-1L to 10-2B each show a table of goniometric centroid plots for a first sample and reference layers and a second sample and reference layers comprising effect pigments. FIGS. 10-1L to 10-2B show the three-dimensional L*, a*, b* (CIELAB) coordinates of the centroid, for example of a point cloud of effect pigment spots 140, 140-1, 140-2 or of a point cloud cluster, of measured sparkle color for a first sample layer (curves 1010SL, 1010SA, 1010SB) and a first reference layer (curves 1010RL, 1010RA, 1010RB) (FIGS. 10-1L to 10-1B) and a second sample layer (curves 1020SL, 1020SA, 1020SB) and a second reference layer (curves 1020RL, 1020RA, 1020RB) (FIGS. 10-2L to 10-2B). FIGS. 10-1L, 10-1A, 10-1B are plots for a first layer embodiment over a range of goniometric geometries r15as-45 to r15as80. FIGS. 10-1L, 10-1A, 10-1B are plots for a second layer embodiment over a range of goniometric geometries r15as-45 to r15as80. Each graph plots a lightness value, for example L* (FIGS. 10-1L and 10-2L), and color-opponent dimensions, for example a* (FIGS. 10-1A and 10-2A), or b* (FIGS. 10-1B and 10-2B) of a spot cloud's centroid 125-1, 125-2 (shown for example in FIG. 3) as a function of illumination and viewing geometry. An alternative graphical embodiment example may use lightness L*–<L*>, and color-opponent dimensions u', v'. In the illustrated embodiments depicting geometrical coordinates from r15as-45 to r15as80, the plots have not been connected between r15as-15 and r15as15 but further measurement would enable a continuous plot to be drawn.

In the embodiment presented in FIGS. 10-1L to 10-1B, the first sample and reference layers comprise grey effect color shades pigmented with three different types of effect pigments: a first effect pigment based on aluminum, a second effect pigment providing a green interference color or a blue-green combination color, and a third effect pigment providing a green color. Samples and reference depicted in FIGS. 10-1L to 10-1B are based on combinations of three different types of effect pigments, where two types are identical; only the third effect pigment type is different. Analysis of FIG. 10-1A shows a difference greater than 1.0 for centroids at r15as-15 and r15as15, thereby indicating a substantially visible mismatch between the first sample and the first reference. Furthermore the trends in FIG. 10-1A from r15as-45 to r15as-15 or from r15as15 to r15as45 are different between the first sample (plot 1010SA) and the first reference (plot 1010RA), thereby strengthening the indication of a substantially visible mismatch between the first sample and the first reference.

In the embodiment presented in FIGS. 10-2L to 10-2B, the second sample and reference layers are based on effect pigments of the same types as those presented in the embodiment of FIGS. 10-1L to 10-1B. The amounts or relative proportions of each effect pigments are, however, different in the layers of FIGS. 10-2L to 10-2B from the layers of FIGS. 10-1L to 10-1B. FIGS. 10-2L to 10-2B, show a very close match of centroids and trends between sample layer and reference layer for the L* (FIG. 10-2L) or b* (FIG. 10-2B) plots. Although there is some noticeable discrepancy in the a* ordinates or trends between sample and reference (FIG. 10-2A) from r15as-45 to r15as-15 or from r15as15 to r15as45, the discrepancy is of a smaller amplitude (less than 1.0) for the second sample-reference pair of FIG. 10-2A than it is for the first sample-reference pair depicted in FIG. 10-1A. There is therefore a greater similarity between the second sample and the second reference than between the first sample and the first reference.

Hence, analysis of centroid color positions of sparkle spots as a function of measurement geometry provides valuable information about the pigmentation chosen for a color match. Measurement of the differences in centroid position or trends in the L*, a*, or b* graphs may enable a person designing layers comprising effect pigments to adjust a layer's design so as to better match a reference layer design. For example, the method may enable a layer designer to prepare a layer that purposely varies from a known reference layer, for example to design a range of layers. In another example, the method may enable a layer designer to design a layer that better matches an existing layer, for example to repair the existing layer.

A measurement system may therefore usefully provide to a designer the centroid-based graphs of the type presented in FIGS. 10-1L to 10-2B. The graphs may be displayed on a computer screen or on a display embedded in a measurement apparatus, as shown in FIG. 4. An automated effect pigment analysis system may derive statistical information from the L*, a*, or b* coordinates as a function of geometry, as displayed in FIGS. 10-1L to 10-2B, and provide analysis results and recommendations to a person analyzing or designing layers, for example layers comprising effect pigments.

Figure 11:
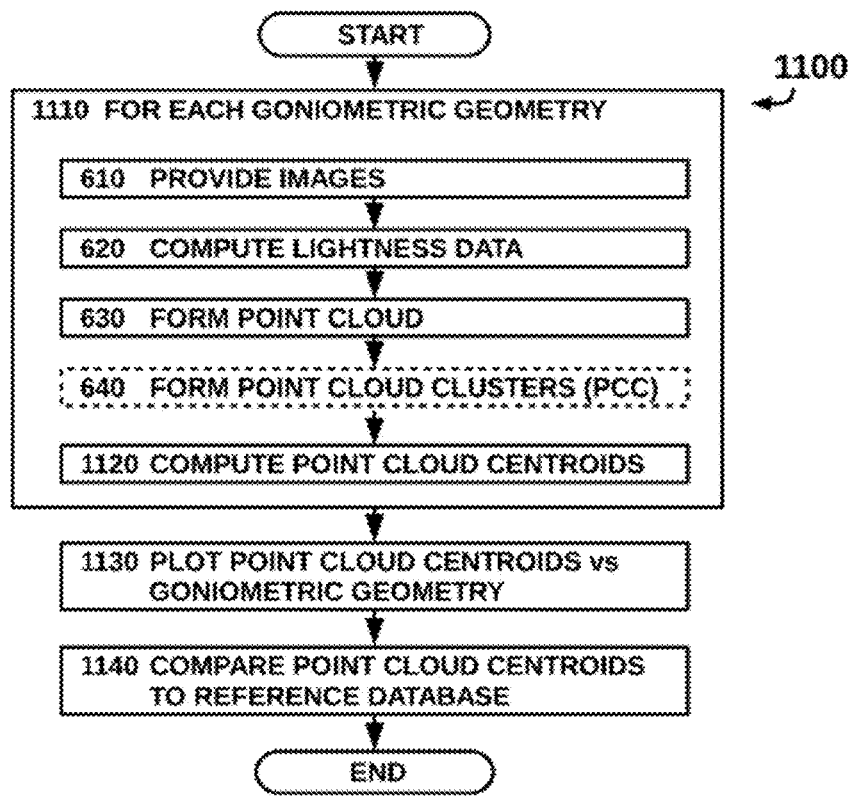
FIG. 11 is a flow chart for a multi-goniometric geometry method for the identification of effect pigments using centroid information.

FIG. 11 is a flowchart for a multi-goniometric geometry method 1100 for the identification of effect pigments using centroid information. FIG. 11 presents a variation of the method presented in FIG. 6 and can be understood in relation to forming the data presented in FIGS. 10-1L to 10-2B presenting L*, a*, b* values of point cloud centroids versus goniometric geometry. The method iterates at step 1110 by performing computation steps for each goniometric geometry that have formed images of a layer, for example from goniometric geometries 15as-45 to 15as80, comprising: providing images 610; computing lightness data 620; forming one or more point clouds 630; forming one or more point cloud clusters (PCC) 640; and computing one or more point cloud centroids 1120. Computing one or more point cloud centroids 1120 may for example be done for one or more goniometric geometric settings for at least one of L*, a*, or b*, or at least one of L*, u', v'. The method 1100 may further comprise forming a graph or table, for example a look-up table, of point cloud centroids versus goniometric geometry. The graph may be plotted on a display and used for analysis by an operator. The look-up table may be used as a further source of reference data by an effect pigment classifier. The method 1100 may yet further comprise a step 1140 of comparing point cloud centroids to reference data 495, 497 comprised in the reference database 490.

Figure 12:
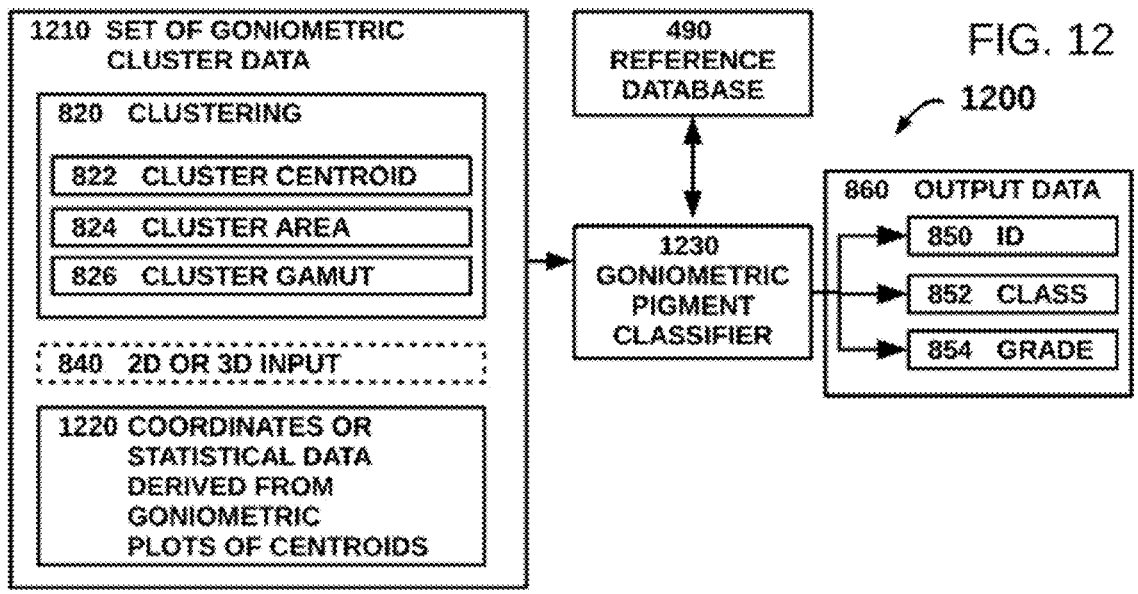
FIG. 12 is a flowchart for a computer-based multi-goniometric geometry method for effect pigment identification using centroid information.

FIG. 12 is a flowchart for a computer-based multi-goniometric geometry method 1200 for effect pigment identification using centroid information. FIG. 12 is similar to FIG. 8 but for example comprises a plurality of goniometric cluster data derived from goniometric measurements, thereby offering the possibility to reduce classification errors thanks to a larger dataset. The multi-goniometric geometry method 1200 comprises forming a set of goniometric cluster data 1210, the method comprising applying a clustering method 820. The clustering method comprises forming: one or more cluster centroids 822 (an exemplary embodiment of which is plotted in FIGS. 10-1L to 10-2B); one or more cluster area values 824, for example: the area of the cluster projected onto the chromaticity diagram 110 or the surface of the cluster's envelope; and a cluster gamut 826, for example a u', v' or L*-related, a*, b* gamut computed for each cluster. The method may comprise a two-dimensional or three-dimensional input 840 feeding two- or three-dimensional spot data (for example coordinates, statistical distribution) into a goniometric effect pigment classifier 1230. The method may further comprise a step 1220 supplying to the effect pigment classifier 1230 one or more of: the coordinates of one or more cluster centroids (for example cluster centroids 822); or statistical data derived from the goniometric plots of centroids or look-up table, of point cloud centroids versus goniometric geometry, an exemplary of which is presented in FIGS. 10-1L to 10-2B via curves 1010SL, 1010SA, 1010SB, 1020SL, 1020SA, and 1020SB. The goniometric effect pigment classifier 1230 may for example be implemented within the point cloud cluster analyzer 740. The goniometric effect pigment classifier 1230 may exchange data with, for example receive data from, the reference database 490. The goniometric effect pigment classifier 1230 outputs results 860, for example: pigment identity 850, pigment class 852, or pigment grade 854. Output results 860 may be added to the reference database 490, for example via the goniometric pigment classifier 1230.

Figure 13:
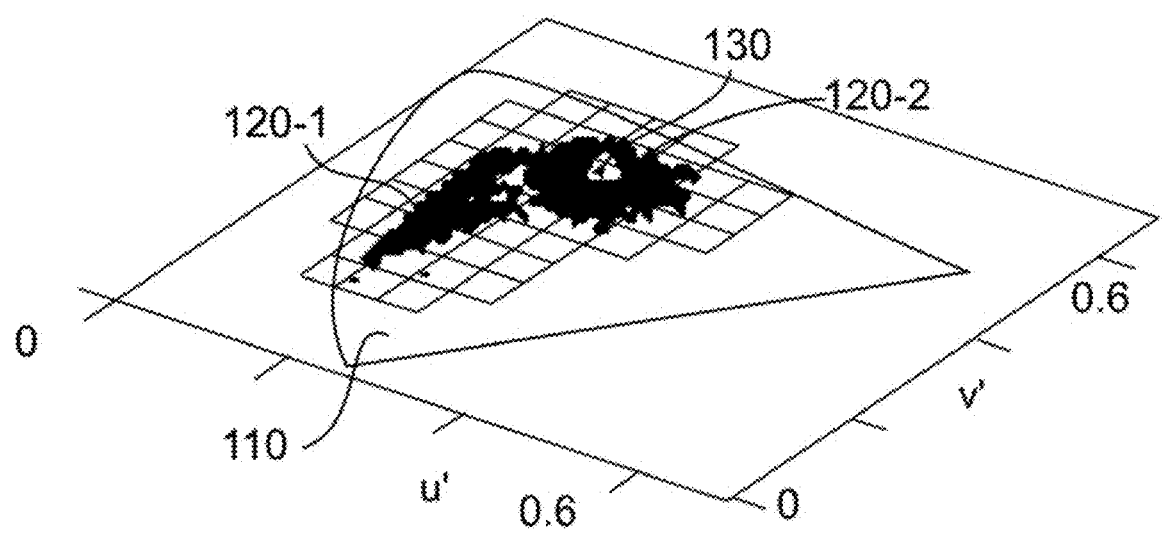
FIG. 13 presents how the (u', v') plane is rasterized.

FIG. 13 presents how the (u', v') plane is rasterized:
1. The (u', v') region enclosing the entire chromaticity diagram 110 is rasterized to form a grid or mesh. A suggested resolution of the mesh is 66×66 but a range from 10×10 to 500×500, for example 20×20 to 100×100, for example 50×50 to 80×80 is also possible within the framework of this disclosure.
2. Then, because that rasterization would generate many empty cells, all cells that do not include any points from any of the reference distribution sparkle points are removed so that what remains is a core grid or mesh.
3. One then adds back one or more surrounding rows of cells, for example 10% to 20% of the span of the initial mesh, around the core mesh so that subsequent sample sparkle points can be caught in the mesh. There is no need to add cells that would not be contained within the rounded triangle formed by the chromaticity diagram 110.

Figure 14:
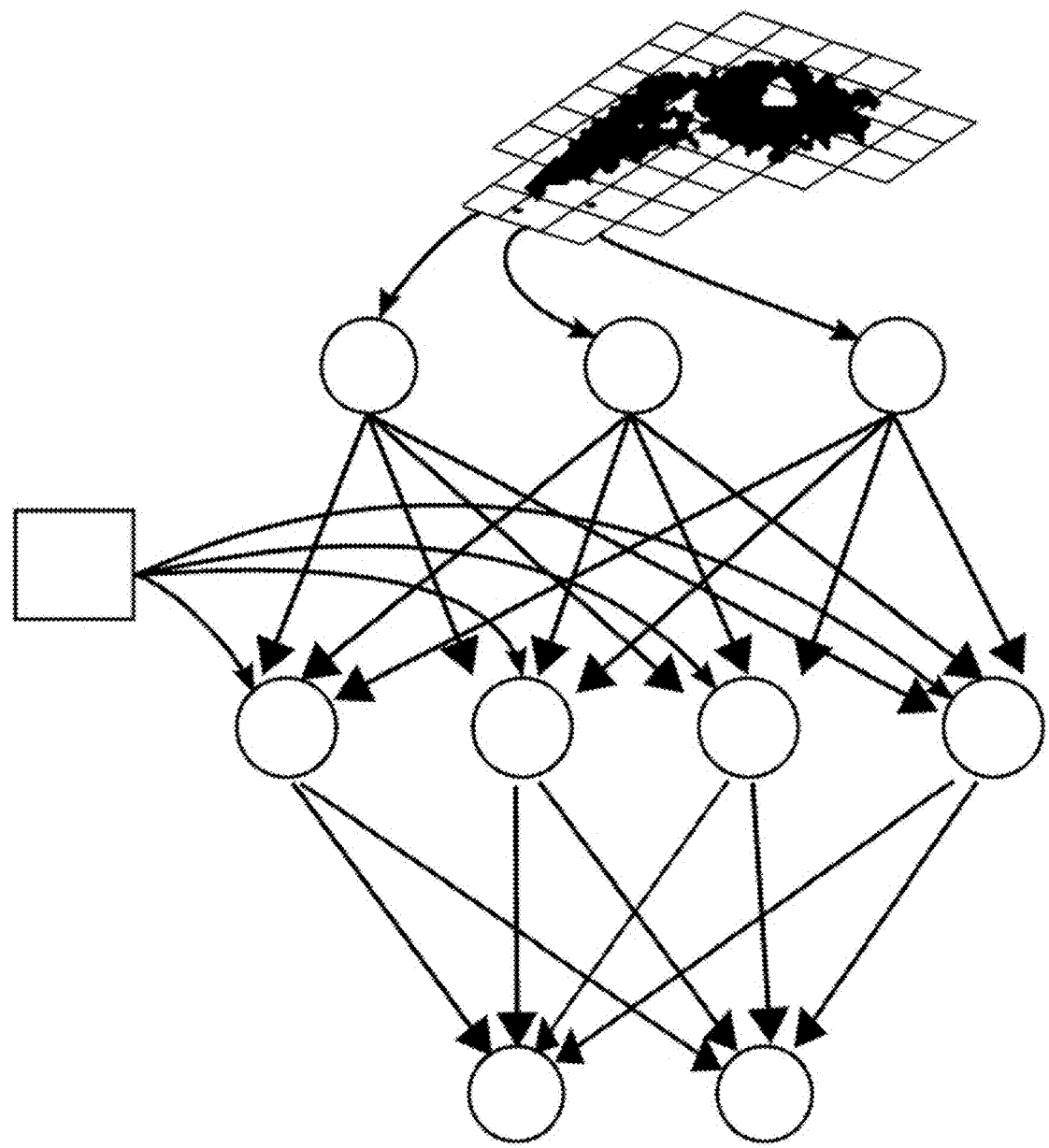
FIG. 14 illustrates how each cell of the mesh feeds to an input neuron of the neural network's input layer.

FIG. 14 illustrates how each cell of the mesh feeds to an input neuron of the input layer of the neural network. Only 3 input neurons are represented for simplicity. The data that may be fed into each input neuron may for example be a sparkle grade (sparkle value, where sparkle grade=average sparkle intensity x input cell area). The network (e.g., a so-called Perceptron) has one input layer, at least one hidden layer (4 neurons shown), and one output layer (2 outputs shown). The hidden network also has a bias (square box) that may be adjusted (e.g. value between 0.0001 and 1) to scale the weights of each connection going from the bias to the hidden layer cells. One may also add an output network bias (not shown). The number of output neurons should be chosen so that the range of reference distribution association data can be covered by the output layer. For example if the network is trained to recognize 16 references and the output layer is made of cells that can only represent binary values (0 or 1) then 4 output cells will be needed. The network may have 30 input cells and 30 output cells and may have a hidden layer with about 75 cells. The appropriate dimensions of the network can only be correctly determined through experimentation. When the neural network is in a mode for learning the reference sparkle points, the weights associated with each connection of the neural network may be updated by, for example, a backpropagation neural network learning paradigm.

Figure 15:
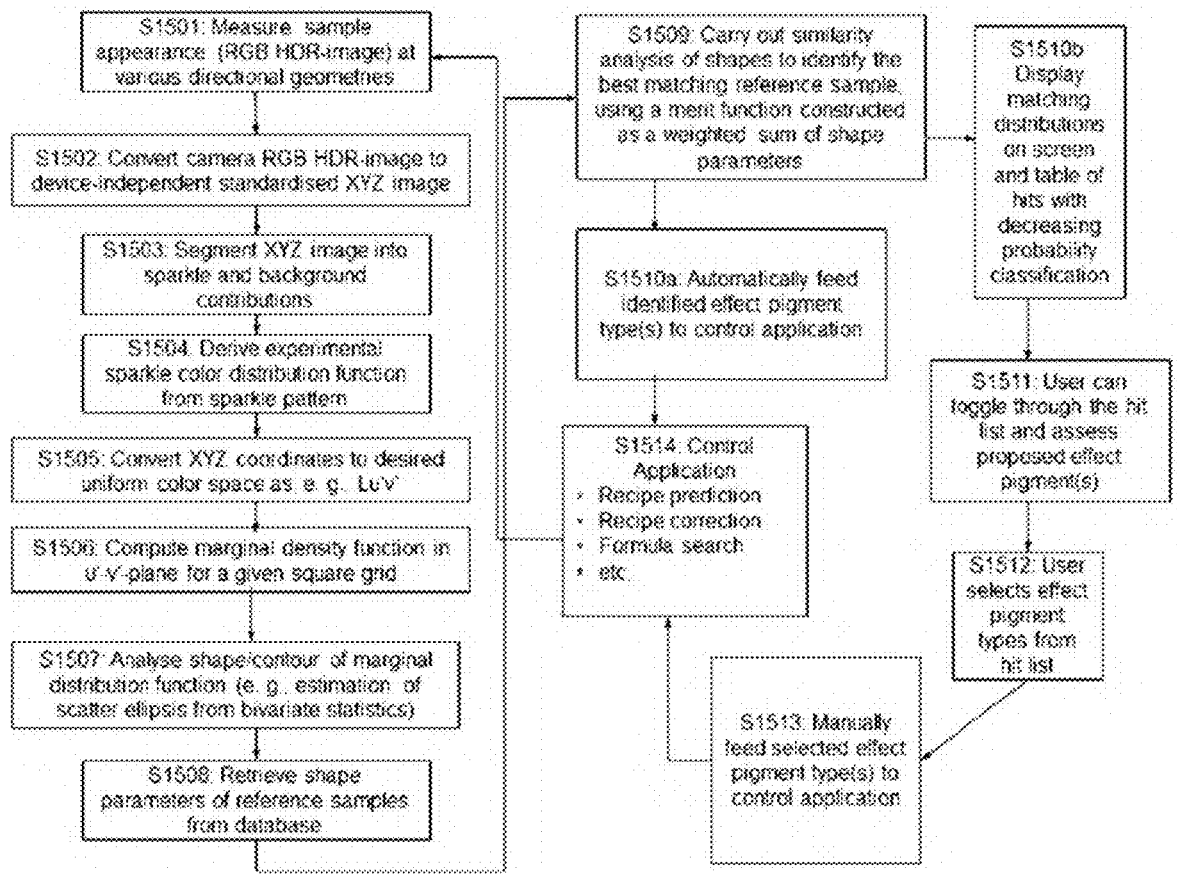
FIG. 15 constitutes a flow diagram of an embodiment of the method according to the first example of the second aspect.

FIG. 15 constitutes a flow diagram of an embodiment of the method according to the first example of the second aspect. In step S1501, the appearance of a sample is measured by taking an RGB HDR image at various directional geometries which represents the digital image described by the sample image data. In subsequent step S1502, the camera image is converted from an RGB HDR format to a device-dependent standardized image in XYZ color space format. This is followed by step S1503 of segmenting the XYZ image into sparkle and background contributions. In the following step S1504, the experimental sparkle color distribution function is derived from the sparkle pattern which corresponds to determining the sparkle point data. In step S1505, the XYZ coordinates of the sparkle color distribution function are converted to a desired uniform color space such as (L, u', v'). In step S1506, the marginal distribution function is computed in the u'-v'-plane for a given square grid, which is followed by step S1507 of analyzing the shape, for example contour, of the marginal density function (e.g. by estimation of a scatter ellipsis received from bivariate statistics) in order to determine the sparkle point distribution geometry data. Step S1508 then retrieves the shape parameters of reference sample from a database, which encompasses acquisition of the reference distribution geometry data. The sample pigment identity data is then determined in step S1509 be carrying out a similarity analysis of the shape parameters of the reference samples relative to the determined shape of the marginal distribution function to identify the best-matching reference sample (i.e. reference effect pigment). This is done using a merit function constructed as a weighted sum of shape parameters. The best-matching reference sample is then determined to be the sample effect pigment.

This can be followed by at least one of steps S1510a or S1510b. Step S1510a encompasses an automatic feed of the (at least one) identified effect pigment (the identity of the sample effect pigment) to a control application. The control application in step S1514 conduct recipe prediction or correction or search for a formula describing the formulation of the sample effect pigment. Step S1510b encompasses displaying a list of matching reference distributions on a screen of a display device within a table of hits sorted by decreasing probability of classification (i.e. probability for correct identification of the sample reference pigment as the respective reference effect pigment). Step S1511 then allows a user to toggle through the hit list displayed by the display device and assess the reference effect pigments proposed to be the sample effect pigment. In step S1512, the user can then select a suitable proposal from the hit list corresponding to receiving the input data for selecting (at least) one of the identities. The selected at least one sample effect pigment (or reference effect pigment, respectively) may then be fed to the control application in response to (manual) user input for further processing according to aforementioned step S1514.

In one specific example, the method may then start anew with execution of step S1501, for example by analyzing a further sample effect pigment.

In the foregoing specification, embodiments have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A computer-implemented method for identifying an effect pigment, the method comprising executing, on at least one processor of at least one computer, steps of:
   a) acquiring sample image data describing a digital image of a layer comprising a sample effect pigment;
   b) determining, based on the sample image data, sparkle point data describing a sample distribution of sparkle points defined by the digital image, wherein each sparkle point in the sample distribution is described by three coordinates in a three-dimensional color space having a coordinate defining lightness and two coordinates defining chromaticity of the sparkle points;
   c) determining, based on the sparkle point data, sparkle point transformation data describing a projection of the sample distribution onto a two-dimensional color space, wherein the two-dimensional color space is defined as a chromaticity plane and the projection has a direction perpendicular to the chromaticity plane, wherein the chromaticity plane is parallel to two axes of the three-dimensional color space that define the two chromaticity coordinates and perpendicular to an axis that defines the lightness coordinate of the three-dimensional color space;
   d) determining, based on the sparkle point transformation data, sparkle point distribution geometry data describing a geometry of the sample distribution in the two-dimensional color space, said geometry of the sample distribution representing a geometric shape of a marginal density function of the sample distribution in the two-dimensional color space;
   e) acquiring a reference distribution geometry database, wherein each entry in the reference distribution geometry database comprises reference distribution geometry data describing a geometry of a reference distribution of sparkle points in the two-dimensional color space, said geometry of the reference distribution representing a geometric shape of a marginal density function of the reference distribution in the two-dimensional color space;
   f) acquiring a reference distribution association database, wherein each entry in the reference distribution association database describes an association between a reference distribution associated with an entry in the reference distribution geometry database and an identifier of the reference distribution, the identifier defining the identity of a reference effect pigment for which the reference distribution has been generated;
   g) comparing the sparkle point distribution geometry data to each entry of the reference distribution geometry database to find a reference distribution whose geometry is similar to the geometry of the sample distribution; and
   h) determining, using the reference distribution association data, sample pigment identity data describing an identity of the sample effect pigment, the identity of the sample pigment being the identity of the reference pigment associated with the reference distribution whose geometry is similar to the geometry of the sample distribution.

2. The method according to claim 1, wherein the geometry of the sample distribution is elliptical and each geometry in the reference distribution geometry database is elliptical.

3. The method according to claim 1, wherein the coordinate defining lightness defines a difference between a lightness of the respective sparkle points and a mean lightness of the sparkle points.

4. The method according to claim 1, wherein the reference distribution whose geometry is similar to the geometry of the sample distribution is determined based on determining, from the reference distribution geometry database, the reference distribution geometry that best fits the geometry of the sample distribution of sparkle points.

5. The method according to claim 4, wherein the reference distribution of sparkle points whose geometry best fits the geometry of the sample distribution is determined by optimizing a merit function.

6. The method according to claim 5, wherein the merit function is defined by a difference between values of shape parameters characterizing the geometry of the reference distribution on the one hand and the values of corresponding shape parameters characterizing the geometry of the sample distribution on the other hand.

7. The method according to claim 5, wherein the geometry of each entry in the reference distribution geometry database and of the sample distribution is elliptical and the merit function describes at least one of a distance between the centers of the ellipses describing the geometry of the reference distribution and the geometry of the sample distribution, a distance between the areas of the ellipses describing the geometry of the reference distribution and the geometry of the sample distribution, or a distance between the orientation angles of the ellipses describing the geometry of the reference distribution and the geometry of the sample distribution.

8. A computer-implemented method of selecting an effect pigment, comprising execution of the method according to claim 1, wherein
   the sample pigment identity data is determined for at least two different reference distributions, and the sample identity data describes at least two possible identities of the sample effect pigment,
   the method further comprising executing, by the at least one processor, steps of:
   issuing, to an electronic display device, display data describing a list defining a prioritization of the at least two possible identities,
   receiving input data for selecting, based on the displayed list, one of the possible identities.

9. The computer-implemented method of claim 8, wherein the method further comprises executing, by the at least one processor, a step of
   determining a recipe for the effect pigment with the selected identity on the basis of the selected identity.

10. A non-transitory computer-readable program storage medium on which a computer program is stored, the computer program, when running on at least one processor of at least one computer or when loaded into the memory of at least one computer, causes the at least one computer to perform the method according to claim 1.

11. At least one computer, comprising at least one processor, a computer program, and a memory,
  wherein the computer program, when executed by the at least one processor, causes the at least one computer to perform the method according to claim 1.

12. A system for identifying an effect pigment, the system comprising:
  a) the at least one computer according to claim 11;
  b) at least one electronic data storage device storing at least the reference distribution geometry data and the reference distribution association data; and
  c) at least one digital imaging device for generating the sample image data,
    wherein the at least one computer is operably coupled to the at least one electronic data storage device for acquiring, from the at least one data storage device, at least one of the reference distribution data or the reference distribution association data, and to the digital imaging device for acquiring, from the digital imaging device, the sample image data.

13. The system according to claim 11, further comprising at least one illumination source for illuminating the layer.

\* \* \* \* \*